United States Patent
Toku

(10) Patent No.: US 11,137,734 B2
(45) Date of Patent: Oct. 5, 2021

(54) CONTROLLER, CONTROL METHOD AND PROGRAM

(71) Applicant: OMRON Corporation, Kyoto (JP)

(72) Inventor: Takahiro Toku, Kusatsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/643,545

(22) PCT Filed: Jan. 22, 2019

(86) PCT No.: PCT/JP2019/001780
§ 371 (c)(1),
(2) Date: Feb. 29, 2020

(87) PCT Pub. No.: WO2019/163366
PCT Pub. Date: Aug. 29, 2019

(65) Prior Publication Data
US 2020/0201279 A1    Jun. 25, 2020

(30) Foreign Application Priority Data

Feb. 26, 2018  (JP) .............................. JP2018-032043

(51) Int. Cl.
*G05B 19/05*   (2006.01)
*G05B 19/418*  (2006.01)
*G06F 9/50*    (2006.01)

(52) U.S. Cl.
CPC ......... *G05B 19/05* (2013.01); *G05B 19/4185* (2013.01); *G06F 9/50* (2013.01)

(58) Field of Classification Search
CPC ...... G05B 19/00; G05B 19/042; G05B 19/05; G05B 19/4185; G06F 9/00; G06F 9/06;
(Continued)

(56) References Cited

U.S. PATENT DOCUMENTS 6,026,425 A * 2/2000 Suguri ................. G06F 9/5083
                                                    709/223
6,034,946 A * 3/2000 Roginsky ............... H04L 45/12
                                                    370/229
(Continued)

FOREIGN PATENT DOCUMENTS

JP  2000-341357 A    12/2000
JP  2003-67014 A  *  8/2001
(Continued)

OTHER PUBLICATIONS

English translation of the International Search Report("ISR") of PCT/JP2019/001780 dated Apr. 23, 2019.
(Continued)

*Primary Examiner* — Boris D Grijalva Lobos
(74) *Attorney, Agent, or Firm* — Metrolex IP Law Group, PLLC

(57) ABSTRACT

An object of the present disclosure is to provide an environment where the functions of communicating with an external device are multiplexed in a controller. A controller executes a plurality of communication programs, and executes a user program for controlling an object to be controlled, the user program including an instruction for communicating with an external device. The controller includes a communication interface that is connectable to any of the plurality of communication programs and controls communication between the plurality of communication programs and the external device. The controller receives data to be communicated to the external device when the instruction is executed, and based on a destination of the data, determines a communication program for transmitting the data to the external device, from among the plurality of communication programs.

13 Claims, 20 Drawing Sheets

(58) Field of Classification Search
CPC ... G06F 9/46; G06F 9/466; G06F 9/50; G06F 9/5005; G06F 9/541; Y02P 90/00; Y02P 90/02; H04L 67/00; H04L 67/32
See application file for complete search history.

(56) References Cited

U.S. PATENT DOCUMENTS

| | | | | |
|---|---|---|---|---|
| 6,453,210 | B1* | 9/2002 | Belotserkovskiy | G06Q 10/06 700/96 |
| 6,725,272 | B1* | 4/2004 | Susai | H04L 29/06 709/229 |
| 7,774,492 | B2* | 8/2010 | Raphel | H04L 47/10 709/235 |
| 8,024,450 | B1* | 9/2011 | Shiyafetdinov | H04L 41/044 709/223 |
| 8,209,740 | B1* | 6/2012 | Kulaga | H04L 63/20 726/1 |
| 9,329,842 | B1* | 5/2016 | Chan | G06F 8/38 |
| 9,870,269 | B1* | 1/2018 | Viswanathan | G06F 9/5055 |
| 2003/0023743 | A1 | 1/2003 | Raphel et al. | |
| 2004/0006615 | A1* | 1/2004 | Jackson | H04L 41/5009 709/223 |
| 2009/0228611 | A1 | 9/2009 | Ferguson et al. | |
| 2010/0161852 | A1* | 6/2010 | Veni | G06F 11/0727 710/38 |
| 2010/0191796 | A1* | 7/2010 | Almeida | H04L 67/1002 709/202 |
| 2011/0072427 | A1 | 3/2011 | Garmark | |
| 2011/0289485 | A1* | 11/2011 | Mejdrich | G06F 11/3636 717/128 |
| 2011/0289512 | A1* | 11/2011 | Vecera | H04L 67/1008 719/313 |
| 2013/0060838 | A1* | 3/2013 | Yaffe | G06F 9/5027 709/203 |
| 2014/0236997 | A1 | 8/2014 | Okamura et al. | |
| 2014/0297005 | A1 | 10/2014 | Monaka | |
| 2015/0156069 | A1* | 6/2015 | Wu | H04L 67/02 709/221 |
| 2015/0227128 | A1 | 8/2015 | Kitamura et al. | |
| 2016/0156567 | A1* | 6/2016 | Miyahara | H04L 67/1012 709/226 |
| 2017/0195172 | A1* | 7/2017 | Coqueret | H04L 41/0803 |
| 2017/0295059 | A1* | 10/2017 | Necas | H04L 41/0806 |

FOREIGN PATENT DOCUMENTS

| | | |
|---|---|---|
| JP | 2003-067014 A | 3/2003 |
| JP | 2011-513854 A | 4/2011 |
| JP | 2013-505498 A | 2/2013 |
| JP | 2014-078253 A | 5/2014 |
| JP | 2014-157506 A | 8/2014 |
| JP | 2014-194592 A | 10/2014 |
| JP | 2015-125654 A | 7/2015 |

OTHER PUBLICATIONS

Written Opinion("WO") of PCT/JP2019/001780 dated Apr. 23, 2019.
Office Action (JPOA) dated Jan. 12, 2021 in a counterpart Japanese patent application.

* cited by examiner

FIG.8

| DESTINATION | IP ADDRESS |
|---|---|
| A | AD1 |
| B | AD2 |
| ... | ... |
| C | AD3 |

FIG.12

| DESTINATION | CLIENT | CONDITION |
|---|---|---|
| A | X | RESPONSE TIME < LEARNING THRESHOLD VALUE |
| B | X | RESPONSE TIME < LEARNING THRESHOLD VALUE |
| ... | ... | ... |
| C | Y | NO CONDITION |

FIG.15

| DESTINATION | CLIENT | CONDITION | ACTION |
|---|---|---|---|
| A | X | RESPONSE TIME < LEARNING THRESHOLD VALUE | TRANSMIT TO COMMUNICATION CLIENT |
| B | X | ... | TRANSMIT TO COMMUNICATION CLIENT |
| ... | ... | ... | ... |
| C | Y | NO CONDITION | TRANSMIT TO BUFFER |

CONTROLLER, CONTROL METHOD AND PROGRAM

TECHNICAL FIELD

The present disclosure relates to a controller such as a programmable logic controller (PLC), a control method and a program. Particularly, the present disclosure relates to a controller in which communication units that perform communication between the controller and an external device are multiplexed, a control method and a program.

BACKGROUND ART

A controller such as a PLC is used, for example, to control an automatic machine in a factory or the like, and has a plurality of input and output functions to sequentially read a value output from, for example, a sensor or the like and hold data. In recent years, a PLC is connected to an external device such as a database system to accumulate data held in the PLC in the database system. This can facilitate sharing of the data among information processing devices connected to the database, or can facilitate collection of various types of data and compilation, analysis or the like of the data.

For example, in Japanese Patent Laying-Open No. 2014-194592 (PTL 1), an instrument monitoring terminal is connected to a setup information controlling device that connects a plurality of communication intermediating instruments. Each communication intermediating instrument connects a plurality of communication-compatible instruments. The instrument monitoring terminal controls the communication intermediating instruments through the setup information controlling device.

In Japanese Patent Laying-Open No. 2014-078253 (PTL 2), each field device is configured using configuration tool software executed on a host computer. Using a configuration tool, the host computer transmits a message to a plurality of field devices and transfers a setting.

CITATION LIST

Patent Literature

PTL 1: Japanese Patent Laying-Open No. 2014-194592
PTL 2: Japanese Patent Laying-Open No. 2014-078253

SUMMARY OF INVENTION

Technical Problem

When a controller such as a PLC communicates with an external device such as a database system and compiles data, it is desired to compile the data without any data loss in order to maintain the reliability of the controller. PTL 1 includes such a configuration that the plurality of communication intermediating instruments are included and the communication instruments are thereby made redundant or multiplexed. However, when the multiplexing configuration in PTL 1 is incorporated into an existing hardware facility such as a PLC, replacement of the facility including the PLC is necessary.

An object of the present disclosure is to provide an environment where the functions of communicating with an external device are multiplexed in a controller, while taking advantage of an existing facility.

Solution to Problem

A controller according to the present disclosure includes: a communication program execution unit that executes a plurality of communication programs; a user program execution unit that executes a user program for controlling an object to be controlled, the user program including an instruction for communicating with an external device; a communication interface that is connectable to any of the plurality of communication programs and controls communication between the plurality of communication programs and the external device; and a determination unit that receives data to be communicated to the external device from the user program execution unit when the instruction is executed by the user program execution unit, and based on a destination of the data, determines a communication program for transmitting the data to the external device, from among the plurality of communication programs.

According to the present disclosure, the plurality of programs for communicating with the external device while sharing the communication interface of the controller are included in the controller. Thus, a multiplexed communication environment for communicating with the external device in the controller is provided.

In the foregoing disclosure, a communication stack may be included for each of the communication programs.

According to the present disclosure, the communication stack is individually provided for each communication program, and thus, the above-described multiplexing at a communication stack level is possible.

In the foregoing disclosure, based on an execution state of each of the communication programs and the destination, the determination unit may determine a communication program for transmitting the data to the external device, from among the plurality of communication programs.

According to the present disclosure, based on the destination of the data, the communication program for transmitting the data to the external device can be determined from among the plurality of communication programs.

In the foregoing disclosure, when the execution state of the communication program based on the destination satisfies a predetermined condition, the determination unit may determine the communication program as a communication program for transmitting the data to the external device.

According to the present disclosure, based on the destination of the data and the execution state of the communication program, the communication program for transmitting the data to the external device can be determined.

In the foregoing disclosure, the execution state of the communication program may be indicated by response performance of communication of the communication program in execution.

According to the present disclosure, the response performance of the communication program can be indicated by the execution state of the communication program.

In the foregoing disclosure, the predetermined condition may include a threshold value of the response performance, and the threshold value may be determined by machine learning using a communication feature amount related to the response performance.

According to the present disclosure, the threshold value for evaluating the response performance can be determined by machine learning using the communication feature amount related to the response performance.

In the foregoing disclosure, when the execution state of the communication program based on the destination does not satisfy the predetermined condition, the determination unit may determine another communication program as a communication program for transmitting the data to the external device.

According to the present disclosure, when the execution state of the communication program determined based on the destination does not satisfy the predetermined condition, the data can be transmitted to the external device using the other communication program.

In the foregoing disclosure, when the execution state of the communication program based on the destination does not satisfy the predetermined condition, the determination unit may output the data to a storage unit.

According to the present disclosure, when the execution state of the communication program based on the destination does not satisfy the predetermined condition, the data can be stored and thus saved.

In the foregoing disclosure, a type of the communication program based on the destination may be different from a type of the prescribed communication program, and the type of the communication program may correspond to a type of a communication protocol in accordance with which the communication program transmits the data.

According to the present disclosure, the data can be transmitted to the external device, using the communication program different in type from the communication program based on the destination of the data, i.e., in accordance with a different transmission protocol.

In the foregoing disclosure, the external device may include a database server or a communication unit that controls communication between the database server and the controller, and the type of the communication protocol may include a communication protocol for connecting to the database server.

According to the present disclosure, the controller can provide, as the above-described multiplexed communication environment, a communication environment for accessing a database using the data from the user program, or a communication environment for accessing a database via the communication unit that controls communication between the database server and the controller.

According to one example of the present disclosure, a control method by a controller including a communication interface for connecting to an external device is provided. The control method includes: executing a user program for controlling an object to be controlled, the user program including an instruction for communicating with the external device; executing a plurality of communication programs for controlling communication with the external device through the communication interface; and receiving data to be communicated to the external device from the user program when the instruction is executed, and based on a destination of the data, determining a communication program for transmitting the data to the external device, from among the plurality of communication programs.

According to the present disclosure, the plurality of programs for communicating with the external device are included in the controller, and thus, a multiplexed communication environment for communicating with the external device in the controller is provided.

According to one example of the present disclosure, a program for causing a computer to execute the above-described control method is provided.

Advantageous Effects of Invention

According to one example of the present disclosure, the plurality of programs for communicating with the external device are included in the controller, and thus, a multiplexed communication environment for communicating with the external device in the controller is provided.

BRIEF DESCRIPTION OF DRAWINGS

FIG. 8 is a schematic diagram showing one example of an address translation table according to the present embodiment.

FIG. 12 is a schematic diagram showing another example of the allocation rule according to the present embodiment.

FIG. 15 schematically shows still another example of the allocation rule according to the present embodiment.

DESCRIPTION OF EMBODIMENTS

Figure 1:
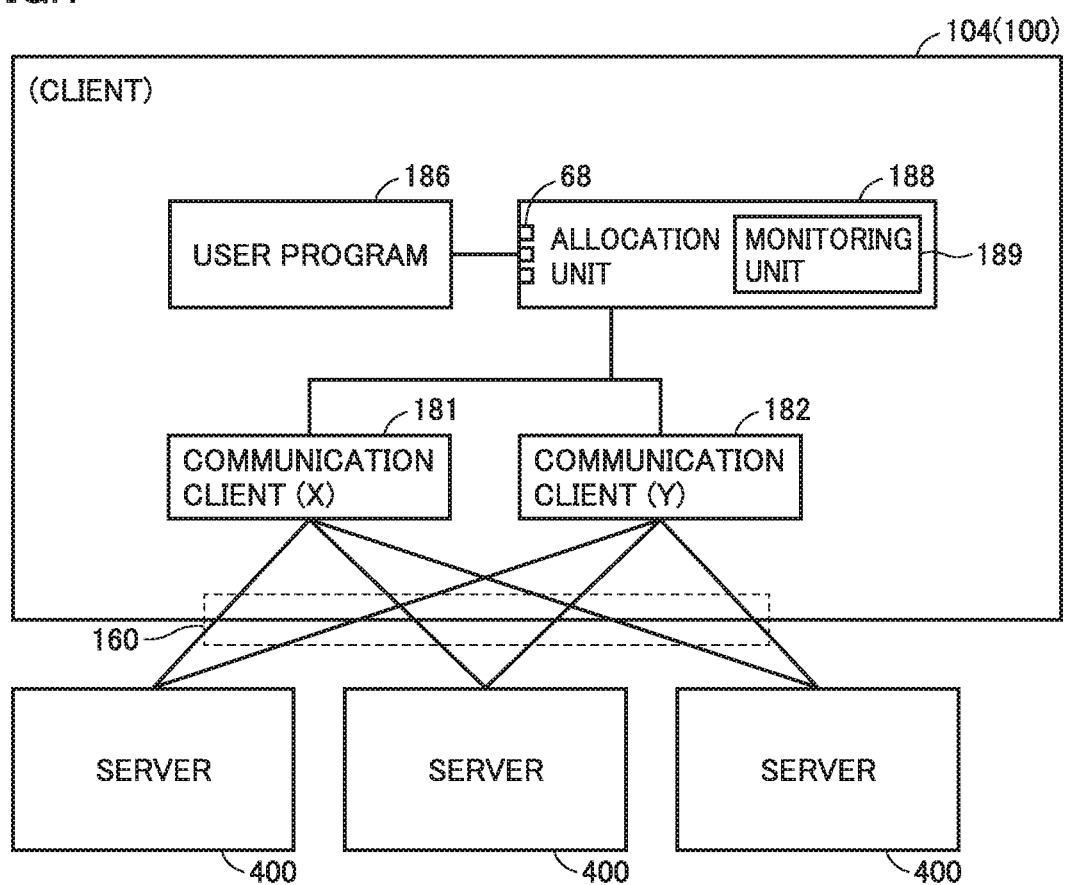
FIG. 1 is a schematic diagram showing one example of an application case of a controller according to the present embodiment.

An embodiment of the present invention will be described in detail with reference to the drawings, in which the same or corresponding portions are denoted by the same reference characters and description thereof will not be repeated.

<A. Application Example>

First, one example of a case where the present invention is applied will be described with reference to FIG. 1. FIG. 1 is a schematic diagram showing one example of an application case of a controller according to the present embodiment. A PLC 100 corresponds to one example of a controller of a control system according to the present embodiment. The controller (e.g., PLC 100) includes: a communication interface (e.g., an upper communication controller 160) for connecting to one or more external devices (e.g., servers 400); a user program execution unit (e.g., a CPU unit 104) that executes a user program 186 for controlling an object to be controlled, user program 186 including an instruction for communicating with the external device; a communication program execution unit (e.g., CPU unit 104) that executes a plurality of communication programs (e.g., a communication client (X) program 181 and a communication client (Y) program 182) that control communication with the external device through the communication interface; and an allocation unit 188.

Communication client (X) program 181 and communication client (Y) program 182 provide the same communication function when executed. For example, communication client (Y) program 182 is created by copying communication client (X) program 181.

A server-client system may, for example, be applied as the control system in FIG. 1. PLC 100 serving as a client communicates with server 400 serving as the external device through the communication interface (e.g., upper communication controller 160) corresponding to an electric communication circuit located in a physical layer, in accordance with, for example, TCP/IP (Transmission Control Protocol/Internet Protocol), while executing user program 186 in an application layer.

In PLC 100, allocation unit 188 as well as communication client (X) 181 and communication client (Y) 182 are provided in a layer between the application layer and the physical layer, e.g., in a session layer. In PLC 100, hierarchization is used as described above, and thus, a program or module (including a circuit) in each layer can be separated from another layer.

A general-purpose computer may, for example, be applied as PLC 100. User program 186 is executed under an OS (Operating System) (more typically, a real-time OS) of the general-purpose computer, to exchange data with various field devices. These field devices include an actuator for performing some sort of process on an object to be controlled, a sensor for obtaining information from an object to be controlled, or the like.

Allocation unit 188 corresponds to one example of "determination unit" that receives data to be communicated to server 400 from the user program execution unit when the instruction is executed by the user program execution unit, and based on a destination of the data, determines a communication program for transmitting the data to server 400, from among the plurality of communication programs. Allocation unit 188 is typically implemented by software (program).

As described above, in the present embodiment, the plurality of communication programs that provide the same communication function when executed can be included in PLC 100. Thus, the means for communicating with server 400 can be multiplexed (or made redundant) in PLC 100, without connecting a plurality of communication devices to PLC 100. In addition, by installing the plurality of communication programs and the program of the determination unit (allocation unit 188) in existing PLC 100, it is possible to achieve the above-described multiplexing in PLC 100, while taking advantage of the existing facility without replacement of the device such as PLC 100.

In addition, PLC 100 in FIG. 1 is configured such that the plurality of communication programs (communication client (X) 181 and communication client (Y) 182) share one communication interface. That is, one communication interface is connectable to any of the plurality of communication programs and controls communication between the plurality of communication programs and server 400. Thus, multiplexing of the communication means in PLC 100 can be achieved, without any increase in the number of circuits such as communication interface 160 of PLC 100.

In addition, in the present embodiment, PLC 100 can use the plurality of communication programs, while switching among the plurality of communication programs in accordance with the destination of the data. Therefore, the present embodiment can also provide an environment where a load of communication between PLC 100 and server 400 can be distributed among the plurality of communication programs.

Server 400 described above may include, for example, various types of servers. Server 400 may include a database server. The data from user program 186 may include a database operation instruction (such as an SQL statement) for accessing the database server. The data may also include a protocol (such as, for example, an FTP (File Transfer Protocol)) specified by user program 186 to transmit the data. The SQL statement or the transmission protocol may indicate a type of the data.

In addition, based on an execution state of each communication program, allocation unit 188 determines a communication program for transmitting the data to server 400, from among the plurality of communication programs. The execution state may be indicated by response performance of communication measured for each communication program. The response performance may be measured when the communication program is in execution, i.e., when the data is transmitted.

The response performance of the communication program may include, for example, the response time of the communication program. The response time may be obtained, for example, by measuring the time required from issuance of a request for data communication to the communication program to reception of a response (Ack) to the request. Alternatively, the response time may be obtained by measuring the time required from transmission of the data to the communication program to reception of a response thereto (e.g., a response indicating that transmission of the data to server 400 has been completed). In the present embodiment, the response performance (response time) may, for example, be measured for each communication program by a monitoring unit 189 of allocation unit 188.

In PLC 100, a communication stack (communication stack 191, 192 in FIG. 4) is individually provided for each communication program. The communication stack is one type of memory area and corresponds to, for example, a part of a non-volatile memory of PLC 100. Since the communication stack is provided for each communication program as described above, multiplexing at a communication stack level is possible.

The communication stack is used as an area that stores an object generated when the communication program is executed. The communication stack is subjected to a process for releasing a used area into a usable area, i.e., a so-called garbage collection, when the used area increases in size. Therefore, while one communication stack is subjected to garbage collection, the other communication stack can be used as an area that stores an object generated during this time. Thus, it is possible to, in the above-described multiplexing, continue communication between PLC 100 and server 400, while distributing a communication load among the plurality of communication programs (i.e., among the plurality of communication stacks).

A more detailed configuration and process of controller 100 according to the present embodiment will be described below as a more specific application of the present invention.

<B. System Configuration>

A system configuration of the control system according to the present embodiment will be described. In the present embodiment, the PLC that controls an object to be controlled such as a machine or a facility is described as a typical example of the controller. However, the controller according to the present invention is not limited to the PLC and is applicable to various types of controllers.

Figure 2:
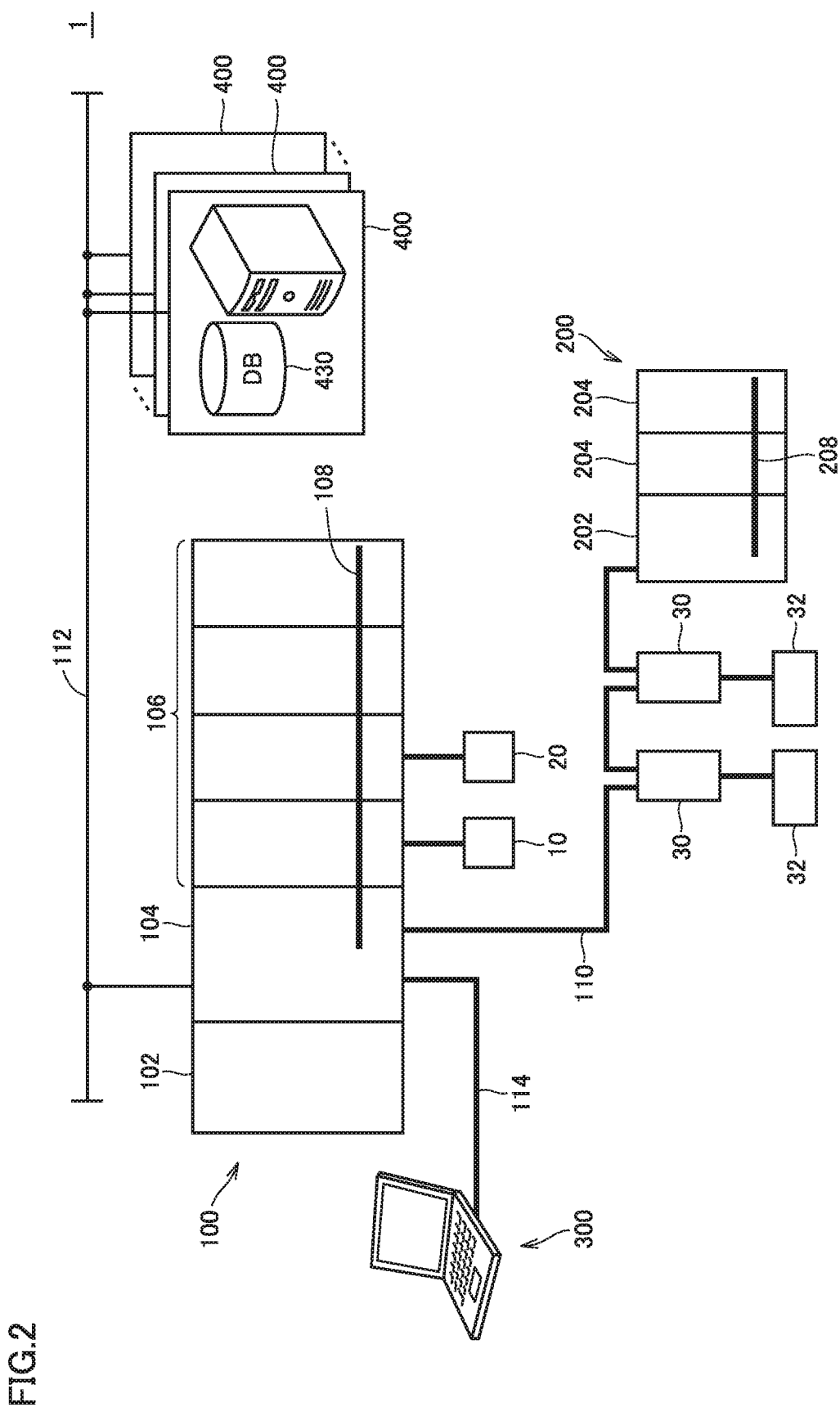
FIG. 2 shows an overall configuration example of a control system according to the present embodiment.

FIG. 2 shows an overall configuration example of the control system according to the present embodiment. Referring to FIG. 2, a control system 1 includes PLC 100, a support device 300 connected to PLC 100, and server 400 including a DB (database) 430 that is accessed from PLC 100. Although control system 1 includes a plurality of servers 400 in the present embodiment, control system 1 may include at least one or more servers 400. Server 400 includes DB 430 and a below-described DBMS (Database Management System) that controls writing and reading of data to and from DB 430.

PLC 100 executes user program 186 in a periodic or event manner. An instruction for accessing DB 430 can be included in user program 186 and PLC 100 can access server 400 in accordance with this access. That is, PLC 100 and server 400 can exchange data with each other through a network 112 such as Ethernet (registered trademark).

Support device 300 is a typical example of an information processing device connectable to PLC 100. Support device 300 is connected to PLC 100 through a connection cable 114 and provides the functions of setting of various parameters, programming, monitoring, debugging and the like to PLC 100. Typically, PLC 100 and support device 300 can communicate with each other in accordance with the USB (Universal Serial Bus) standards.

PLC 100 includes CPU unit 104 that executes a control computation, and one or more IO (Input/Output) units 106. These units can exchange data with each other through a PLC system bus 108. In addition, these units are supplied with electric power having an appropriate voltage from a power supply unit 102.

In control system 1, PLC 100 exchanges data with various field devices through IO units 106 (connected through PLC system bus 108) and/or through a field bus 110. These field devices include an actuator for performing some sort of process on an object to be controlled, a sensor for obtaining various types of information from an object to be controlled, or the like. In FIG. 2, a detection switch 10, a relay 20, and a servo motor driver 30 that drives motor 32 are included as one example of these field devices. A remote IO terminal 200 is also connected to PLC 100 through field bus 110. Basically, remote IO terminal 200 performs a process related to a general input/output process, similarly to IO unit 106. More specifically, remote IO terminal 200 includes a communication coupler 202 for performing a process related to data transmission through field bus 110, and one or more IO units 204. These units can exchange data with each other through a remote IO terminal bus 208.

<C. Hardware Configuration of PLC 100>

Figure 3:
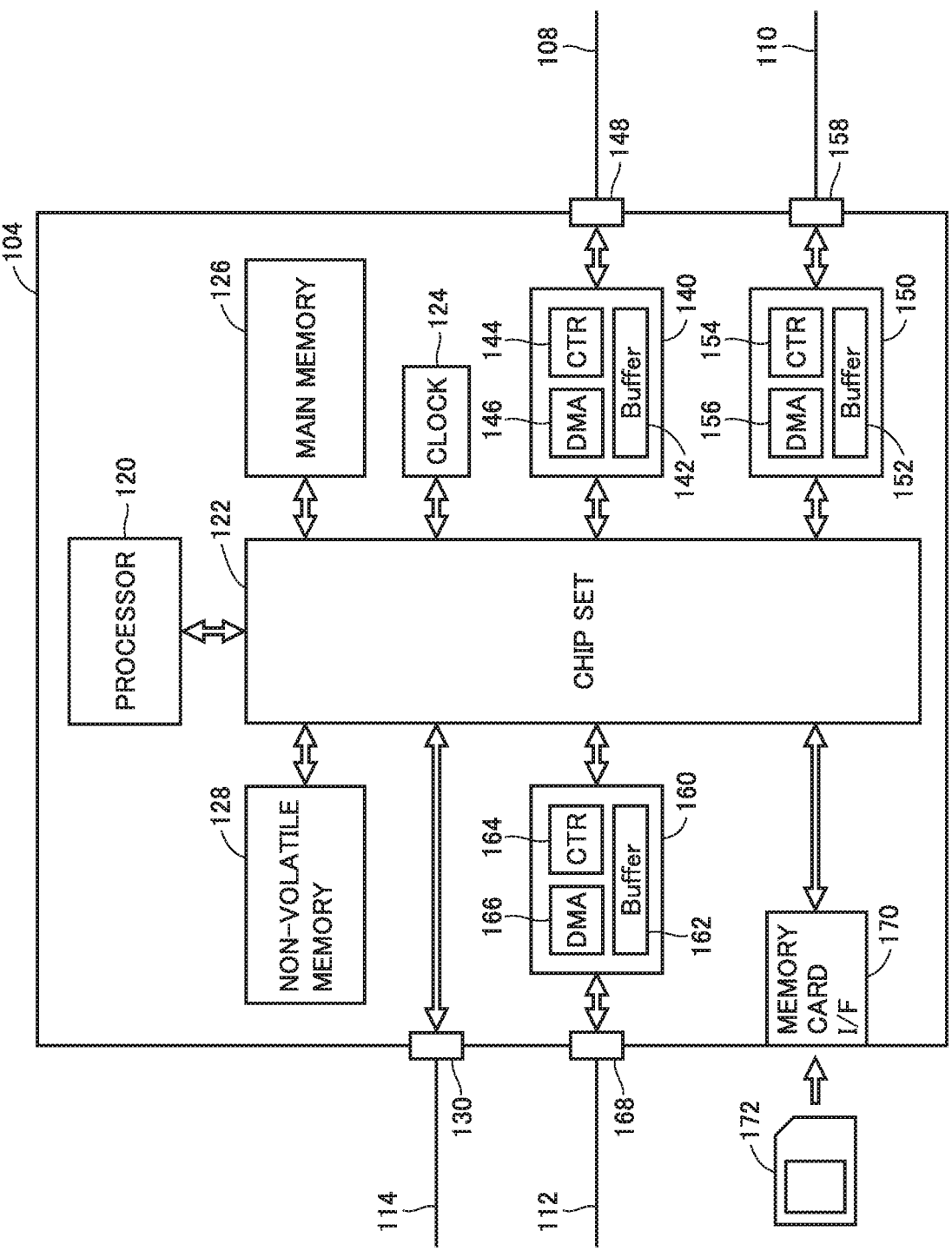
FIG. 3 is a schematic diagram showing one example of a hardware configuration showing a main portion of a PLC according to the present embodiment.

Next, a hardware configuration of PLC 100 according to the present embodiment will be described. FIG. 3 is a schematic diagram showing one example of a hardware configuration showing a main portion of PLC 100 according to the present embodiment.

Referring to FIG. 3, a hardware configuration of CPU unit 104 of PLC 100 will be described. CPU unit 104 includes a processor 120, a chip set 122, a system clock 124, a main memory 126, a non-volatile memory 128, a USB connector 130, a PLC system bus controller 140, a field bus controller 150, upper communication controller 160, and a memory card interface 170. Chip set 122 is coupled to the other components through various buses.

Processor 120 and chip set 122 are typically configured in accordance with a general-purpose computer architecture. That is, processor 120 interprets and executes an instruction code sequentially supplied from chip set 122 in accordance with an internal clock. Chip set 122 exchanges internal data with various components connected thereto, and generates the instruction code necessary for processor 120. System clock 124 generates a system clock having a predetermined period, and provides the system clock to processor 120. Chip set 122 has the function of caching data or the like obtained as a result of execution of the computation process in processor 120.

CPU unit 104 has main memory 126 and non-volatile memory 128 as memory means. Main memory 126 is a volatile memory area, and holds various types of programs to be executed in processor 120 and is also used as a working memory during execution of various types of programs. Non-volatile memory 128 holds various types of programs and data such as an OS, a system program, a user program, data definition information, and log information in a non-volatile manner.

USB connector 130 is an interface for connecting support device 300 to CPU unit 104. Typically, an executable program or the like transferred from support device 300 is captured into CPU unit 104 through USB connector 130.

CPU unit 104 has PLC system bus controller 140, field bus controller 150 and upper communication controller 160 as communication means. These communication circuits transmit and receive data.

PLC system bus controller 140 controls exchange of data through PLC system bus 108. More specifically, PLC system bus controller 140 includes a buffer memory 142, a PLC system bus control circuit 144 and a DMA (Dynamic Memory Access) control circuit 146. PLC system bus controller 140 is connected to PLC system bus 108 through a PLC system bus connector 148.

Field bus controller 150 includes a buffer memory 152, a field bus control circuit 154 and a DMA control circuit 156. Field bus controller 150 is connected to field bus 110 through a field bus connector 158. Upper communication controller 160 includes a buffer memory 162, an upper communication control circuit 164 and a DMA control circuit 166. Upper communication controller 160 is connected to network 112 through a communication port 168. Communication port 168 corresponds to a physical port for connecting to an upper system, and upper communication controller 160 that connects communication port 168 corresponds to one example of "communication interface", for example.

Memory card interface 170 connects processor 120 to a memory card 172 removable from CPU unit 104.

<D. Software Configuration of PLC 100>

Figure 4:
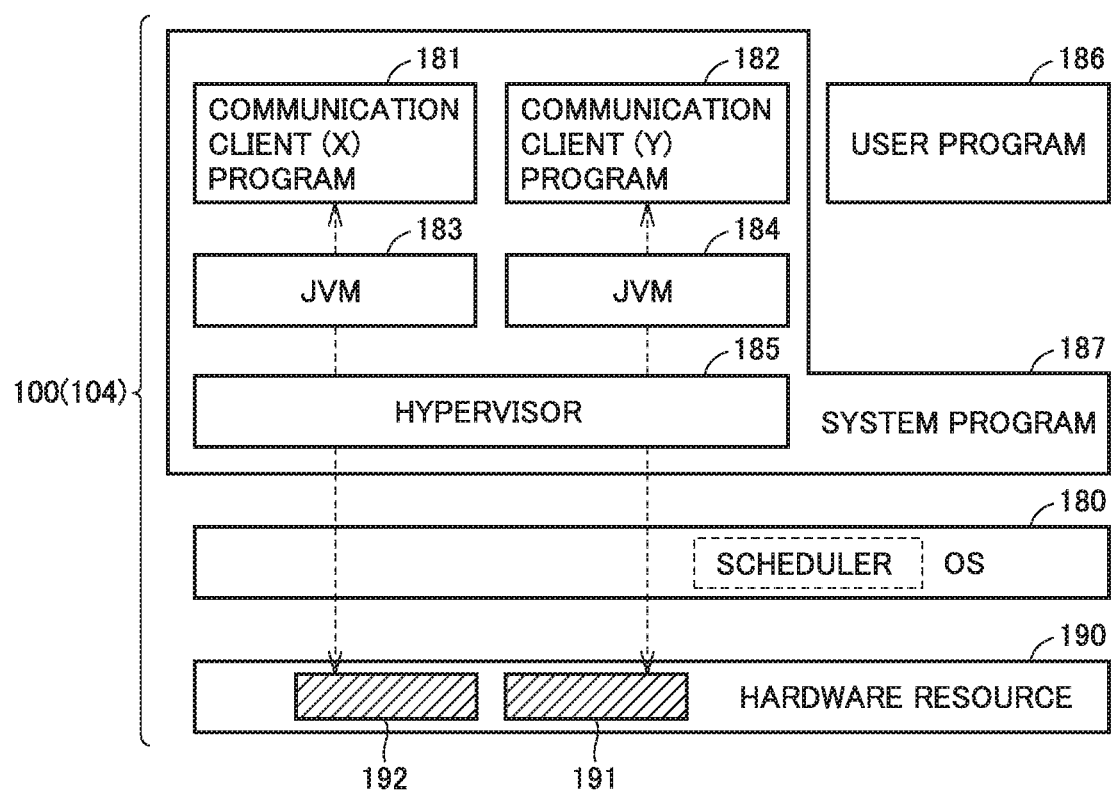
FIG. 4 is a schematic diagram showing one example of a software configuration of the PLC according to the present embodiment.

FIG. 4 is a schematic diagram showing one example of a software configuration of PLC 100 according to the present embodiment. Next, a software configuration for implementing various functions provided by PLC 100 according to the present embodiment will be described with reference to FIG. 4. The instruction code included in the software is read at appropriate timing and executed by processor 120 of CPU unit 104.

PLC 100 has a scheduler for periodically executing the programs including user program 186, communication client (X) program 181 and communication client (Y) program 182 that are executed under an OS 180. When PLC 100 executes user program 186, PLC 100 writes and reads information in the memory area in PLC 100 and sequentially executes the instruction indicated by user program 186. PLC 100 has the input/output function, and receives data such as a sensor output from outside PLC 100 and accumulates the data. PLC 100 communicates with server 400 to store the accumulated data in DB 430. PLC 100 can read the data in DB 430 from server 400 and pass the data to user program 186 and the like.

Referring to FIG. 4, each function of PLC 100 is performed when OS 180, a system program 187, user program 186 and the like operate.

OS 180 is an operating system that controls a hardware resource 190 including a memory and the like of PLC 100, and causes PLC 100 to perform the functions of task scheduling, accessing to server 400, and the like. OS 180 is, for example, a real-time OS and provides a basic execution environment for executing system program 187 and user program 186.

System program 187 is a software group for providing basic functions of PLC 100. In the present embodiment, system program 187 includes a program group that allows PLC 100 to access server 400. The program group includes, for example, communication client (X) program 181 and communication client (Y) program 182 implemented by Java (registered trademark) programs, JVMs (Java virtual machines) 183 and 184 mounted as virtual machines for executing the Java programs, and a hypervisor 185 mounted to allow the virtual machines to use hardware resource 190 through OS 180.

For example, each of communication client (X) program 181 and communication client (Y) program 182 provides a common communication environment for communicating with server 400 to PLC 100, when executed. Hereinafter, communication client (X) program 181 will also be referred to as "communication client (X) 181", and communication client (Y) program 182 will also be referred to as "communication client (Y) 182". Communication client (X) 181 and communication client (Y) 182 will be collectively referred to as "communication client".

Communication client (X) 181 is executed by JVM 183 and communication client (Y) 182 is executed by JVM 184, and communication client (X) 181 and communication client (Y) 182 can thereby be executed in parallel. During execution of communication client (X) 181 and communication client (Y) 182, JVM 183 and JVM 184 use a resource such as hardware resource 190 through hypervisor 185 and OS 180.

As described above, the communication client for communicating with server 400 can be multiplexed (or made redundant) in PLC 100. Although two programs, i.e., communication client (X) 181 and communication client (Y) 182, are executed on JVMs 183 and 184 in the present embodiment, the programs executed on JVMs 183 and 184 are not limited to these two programs and may include another Java program.

For communication client (X) 181 and communication client (Y) 182, communication stack 192 and communication stack 191 restricted to a predetermined size are provided in the memory area of non-volatile memory 128 of hardware resource 190 and the like, respectively. Although communication stack 191 and communication stack 192 are shown as separate areas in FIG. 4, communication stack 191 and communication stack 192 may be a continuous area.

In the present embodiment, user program 186 is designed in accordance with a control purpose (e.g., a target line or process) on the user side. The programs of the communication clients are also designed in accordance with a purpose of communication between PLC 100 and server 400 on the user side. Typically, user program 186 has an object program format that is executable on processor 120 of CPU unit 104. In addition, communication client (X) 181 and communication client (Y) 182 have a format that can be executed by JVMs 183 and 184. User program 186 or communication client (X) 181 and communication client (Y) 182 are generated by being designed and compiled in support device 300 and the like. The generated programs are transferred from support device 300 to CPU unit 104 and stored in non-volatile memory 128 and the like.

Although the programs of the communication clients such as communication client (X) 181 and communication client (Y) 182 are executed by the virtual machines in the present embodiment, the execution environment for the programs of the communication clients is not limited to execution by the virtual machines. For example, similarly to user program 186, the programs of the communication clients may be executed by OS 180 of CPU unit 104.

<E. Configuration of Server 400>

Figure 5:
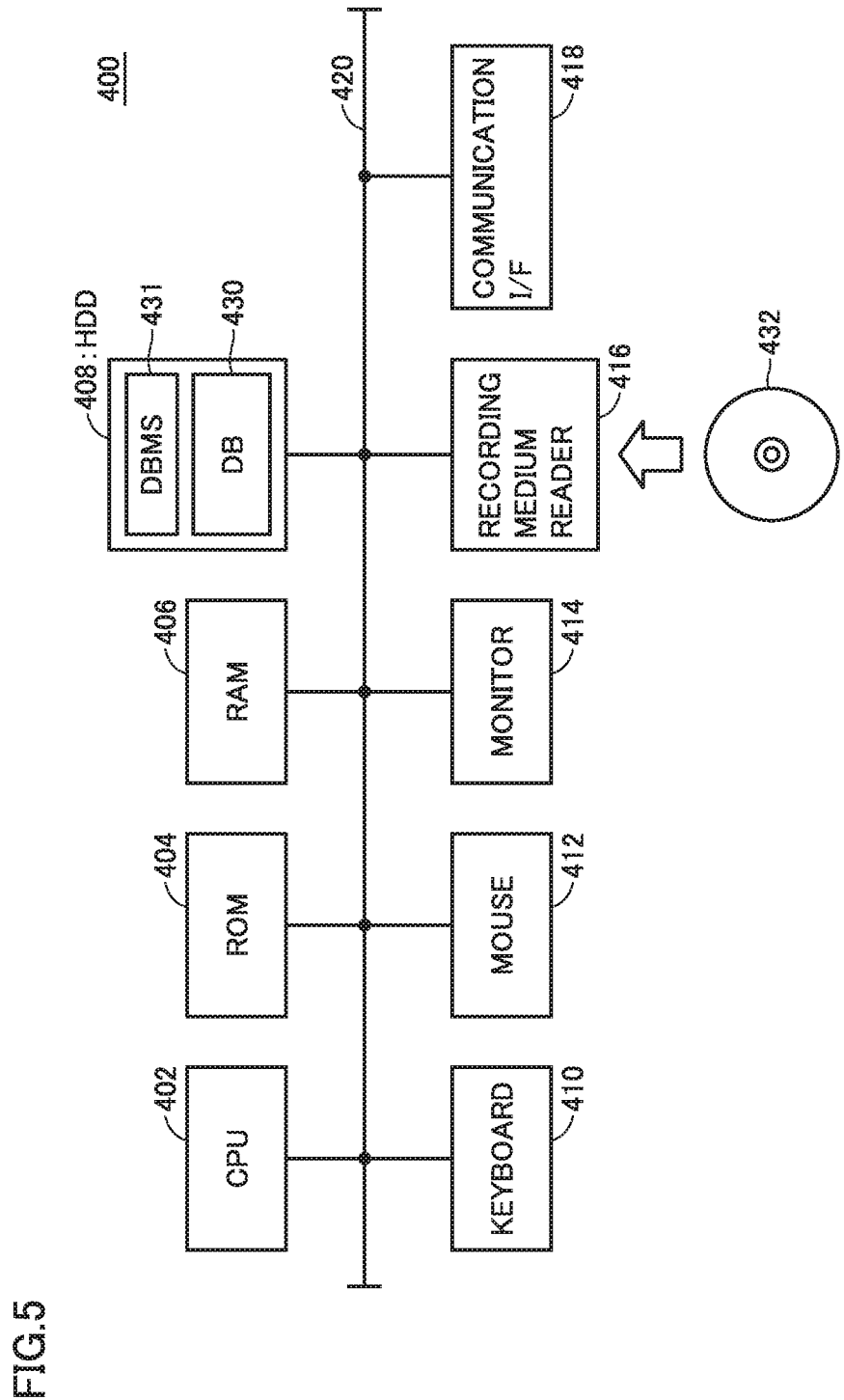
FIG. 5 is a schematic diagram showing one example of a configuration of a server according to the present embodiment.

Next, a configuration of server 400 according to the present embodiment will be described. FIG. 5 is a schematic diagram showing one example of a configuration of server 400 according to the present embodiment. Server 400 is typically implemented by a general-purpose computer.

Referring to FIG. 5, server 400 includes a CPU 402 that executes various types of programs including an OS, a ROM (Read Only Memory) 404 that stores BIOS and various types of data, a memory RAM 406 that provides a working area for storing data necessary for execution of the programs in CPU 402, and a hard disk (FIDD) 408 that stores the programs and the like executed in CPU 402 in a non-volatile manner. More specifically, various types of programs and data including the programs in DB 430 and DBMS 431 are stored in hard disk 408.

Server 400 further includes a keyboard 410 and a mouse 412 that receive operation from the user, and a monitor 414 for presenting information to the user. Server 400 further includes a communication interface (IF) 418 for communicating with PLC 100 (CPU unit 104) and the like. Server 400 includes a recording medium reader 416 for reading a program or data stored in a recording medium 432 from recording medium 432.

Server 400 has a known configuration for providing DB 430. Any configuration such as, for example, a relational-data-type database or an object-data-type database can be used as DB 430. Since server 400 is configured in accordance with a general-purpose computer architecture, detailed description thereof will not be repeated.

Server 400 receives a connection request or an access request (in the case of a relational-data-type database, an SQL statement) from PLC 100, performs a necessary process, and returns the result of the process or the like to PLC 100. Although DB 430 is, for example, a relational-data-type database and DBMS 431 writes and reads data to and from DB 430 in accordance with the SQL statement in the present embodiment, the type of DB 430 and the operation language of DB 430 are not limited to SQL.

<F. Flow of Data and Setting Data>

Figure 6:
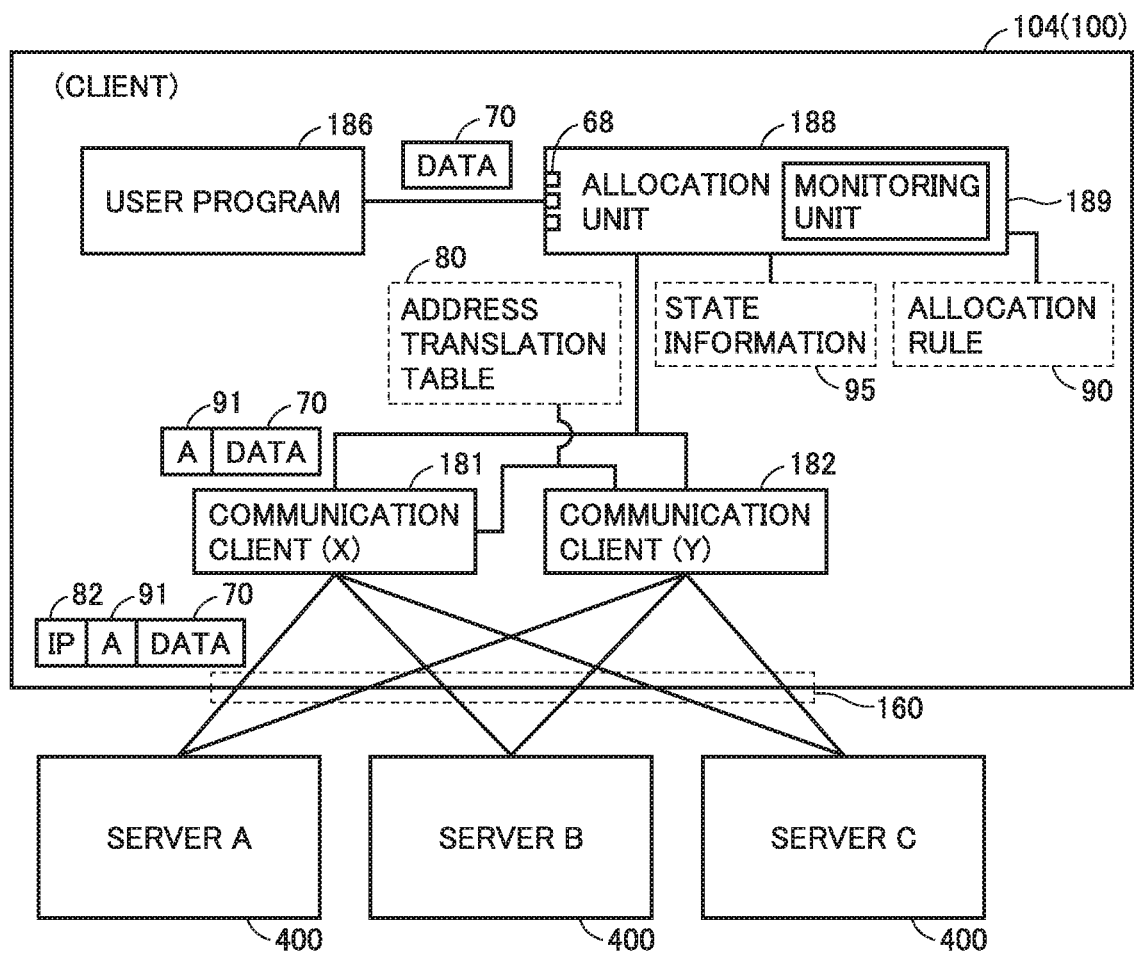
FIG. 6 is a schematic diagram showing one example of a configuration of the PLC together with a flow of data according to the present embodiment.
Figure 7:
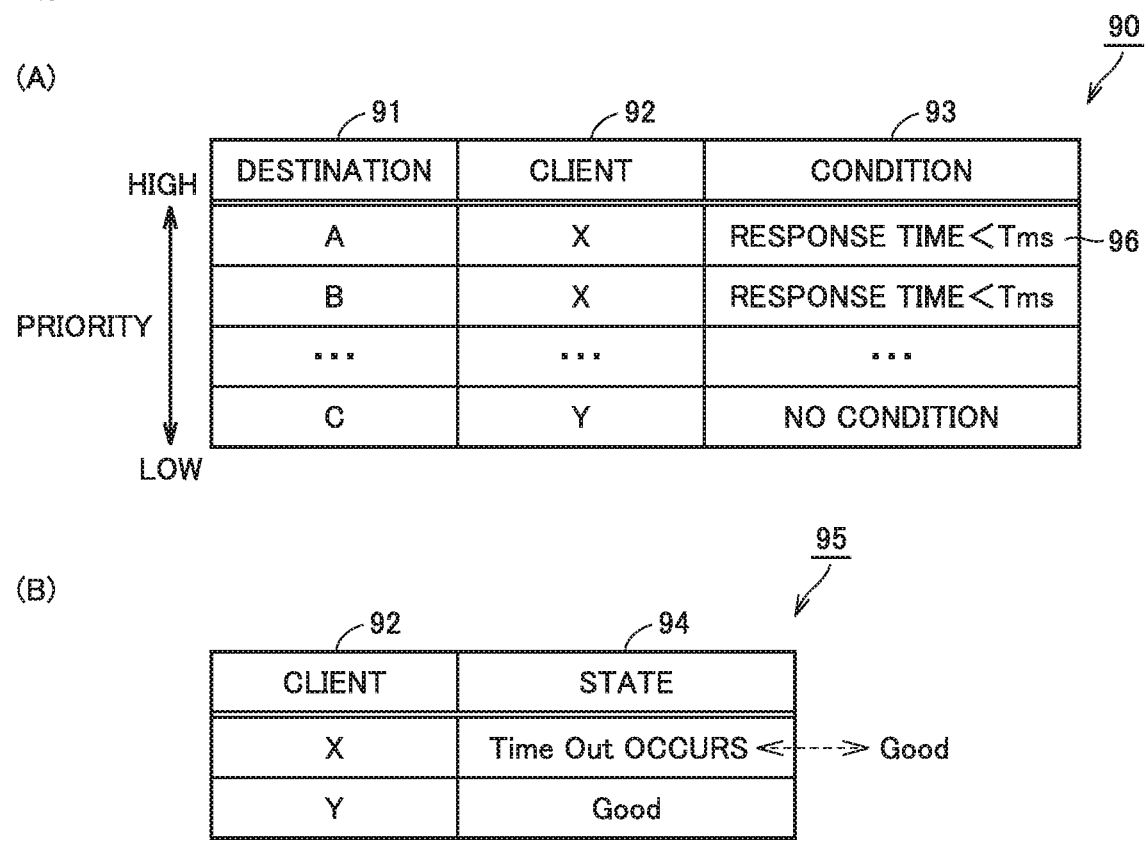
FIG. 7 is a schematic diagram showing one example of an allocation rule and state information according to the present embodiment.

FIG. 6 is a schematic diagram showing one example of a configuration of the PLC together with a flow of data according to the present embodiment. FIG. 7 is a schematic diagram showing one example of an allocation rule and state information according to the present embodiment. Referring to FIG. 7(A), an allocation rule 90 has a plurality of different records. Each record includes a destination 91, a client identifier 92 for identifying the communication client, and a condition 93 in association with one another. Condition 93 includes a threshold value 96 for determining the response performance of the corresponding communication client. Condition 93 indicates response time<Tms (where Tms>0), for example. Although the response time is, for example, described as the response performance of the communication client in the present embodiment, the response performance is not limited to the response time.

Referring to FIG. 7(B), in association with each of communication client (X) 181 and communication client (Y) 182, state information 95 has client identifier 92 and a state 94 of the communication client. State 94 is indicated by the response performance of communication of the communication program that is in execution. That is, the response performance is low (e.g., the response time is long) when the execution speed of the program is low (also including an abnormality of the program), and the response performance is high (e.g., the response time is short) when the execution speed of the program is high. Under such a situation, either "Time Out occurs" or "Good" is, for example, set as state 94, "Time Out occurs" indicates that the response time which is one example of the response performance does not satisfy condition 93 (e.g., response time<Tms) (where Tms>0) including threshold value 96, and "Good" indicates that the response time satisfies condition 93 (e.g., response time<Tms). In accordance with a change in the response performance, state 94 is switched from "Time Out occurs" to "Good" or from "Good" to "Time Out occurs". Threshold value 96 is, for example, preliminarily determined by an experiment or the like.

Figure 8:
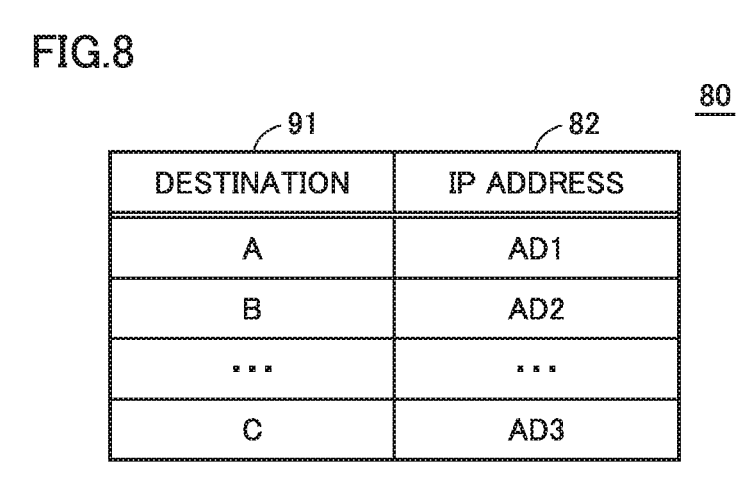

FIG. 8 is a schematic diagram showing one example of an address translation table 80 according to the present embodiment. Address translation table 80 has destination 91 and an IP address 82 corresponding to each destination 91. Allocation rule 90, state information 95 and address translation table 80 are stored in non-volatile memory 128 and the like.

The flow of data to server 400 in PLC 100 will be described with reference to FIG. 6. In FIG. 6, the plurality of servers 400 connected to PLC 100 are, for example, classified into three types, i.e., a server A, a server B and a server C. First, when the instruction for communicating with server 400 in user program 186 is executed and data 70 is output, user program 186 outputs data 70 to one of a plurality of ports 68 included in allocation unit 188. At this time, user program 186 selects one port from the plurality of ports 68 based on the type of data 70, and outputs data 70 to selected port 68.

Monitoring unit 189 measures the response time of communication client (X) 181 and communication client (Y) 182, and outputs an allocation command based on the result of measurement and changes state information 95. The details of the output of the allocation command and the change of state information 95 by monitoring unit 189 will be described below.

Allocation unit 188 performs an allocation process. In the allocation process, allocation unit 188 converts a number (corresponding to an identifier) of port 68 that has received data 70 to destination 91 in accordance with a predetermined conversion rule. As a result, destination 91 is determined for each type of data 70. Based on the below-described allocation command from monitoring unit 189, allocation unit 188 determines the communication client (one of communication client (X) 181 and communication client (Y) 182) to which data 70 is allocated, and passes data 70 having destination 91 appended thereto to the determined communication client.

When the communication client receives data 70 from allocation unit 188, the communication client searches address translation table 80 in FIG. 8 for IP address 82 associated with destination 91, based on destination 91 appended to received data 70. The communication client appends searched IP address 82 to data 70 and outputs data 70 to upper communication controller 160. Upper communication controller 160 receives data 70 from the communication client and transmits data 70 to server 400 in accordance with TCP/IP.

In the present embodiment, data 70 can be transmitted to server 400 corresponding to the type of data 70 as described above.

A search in accordance with the priority of allocation rule 90 will be described. Referring to FIG. 7(A), allocation rule 90 has, for example, a table format. In allocation rule 90, a record including client identifier 92 of communication client (X) 181 is registered on the head side of the table, and a record including client identifier 92 of communication client (Y) 182 follows. When allocation unit 188 searches allocation rule 90, allocation unit 188 sequentially performs a search in a downward direction from the record on the head side of the table of allocation rule 90. As described above, the priority of record search in allocation rule 90 may be set to vary from communication client to communication client. That is, the priority of allocation as the communication client to which data 70 is to be transmitted may be set to vary among the plurality of communication clients. In the present embodiment, as shown in FIG. 7(A), communication client (X) 181 is higher in priority than communication client (Y) 182.

In the present embodiment, in consideration of the above-described priority, threshold value 96 of communication client (X) 181 having a higher priority is set at "Tms", and threshold value 96 of condition 93 of communication client (Y) 182 having a lower priority is set at "no condition".

Specifically, in the present embodiment, threshold value 96 may be changed depending on the size of a communication load of the communication client. Namely, communication client (X) 181 has a higher priority of allocation as the communication client to which data 70 is to be transmitted, and thus, a load of transmission of data 70 is likely to be higher than a communication load of communication client (Y) 182 having a lower priority.

In the present embodiment, in consideration of such variations in communication load, threshold value 96 of communication client (X) 181 having a higher priority is set to be stricter than threshold value 96 of communication client (Y) 182 having a lower priority as described above. Thus, before a communication load of communication client (X) 181 becomes excessive and communication becomes impossible, state 94 can be switched to "Time Out occurs"

and communication client (Y) 182 can be allocated, which makes it possible to achieve distribution of a communication load.

<G. Flowchart>

Figure 9:
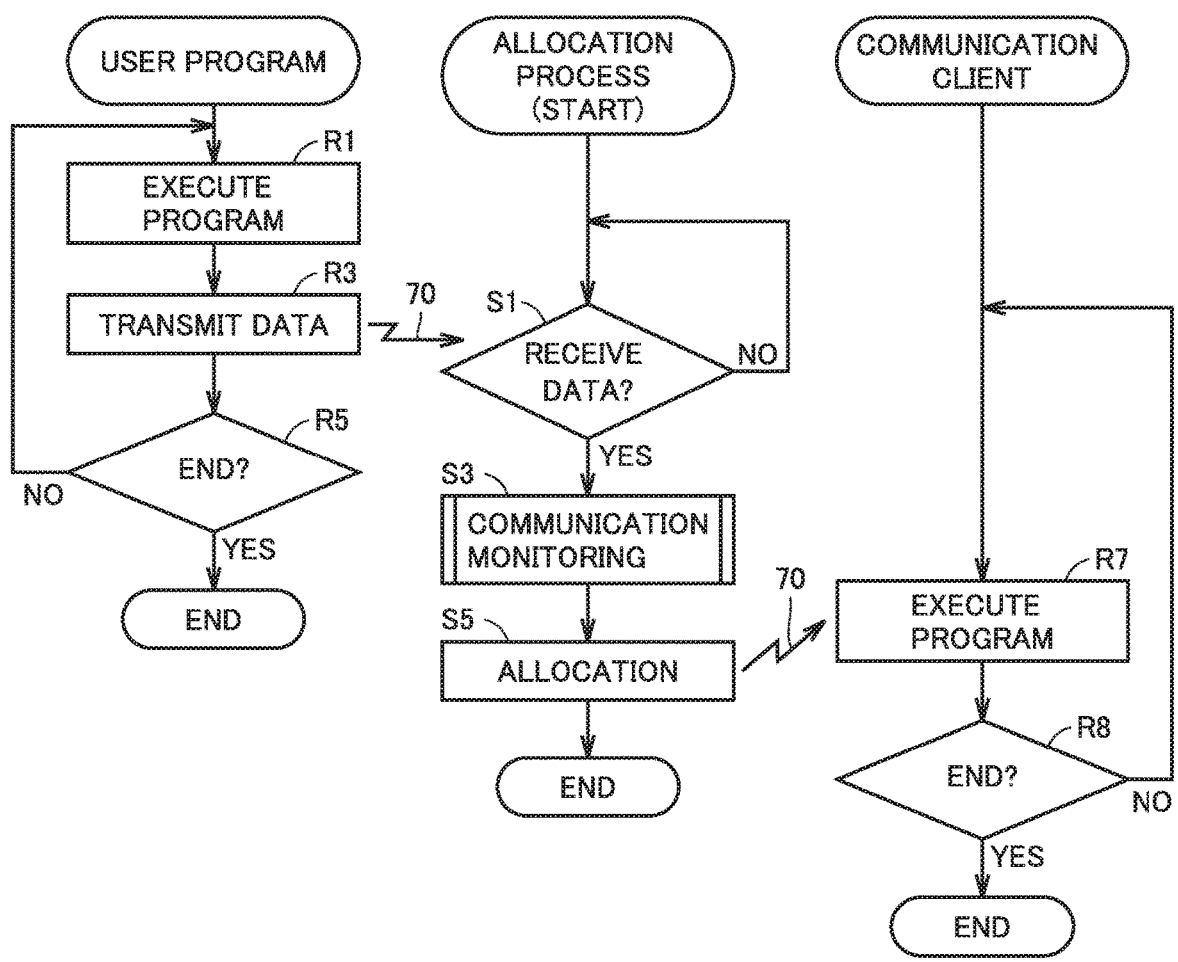
FIG. 9 schematically shows one example of a flowchart of an allocation process according to the present embodiment.
Figure 10:
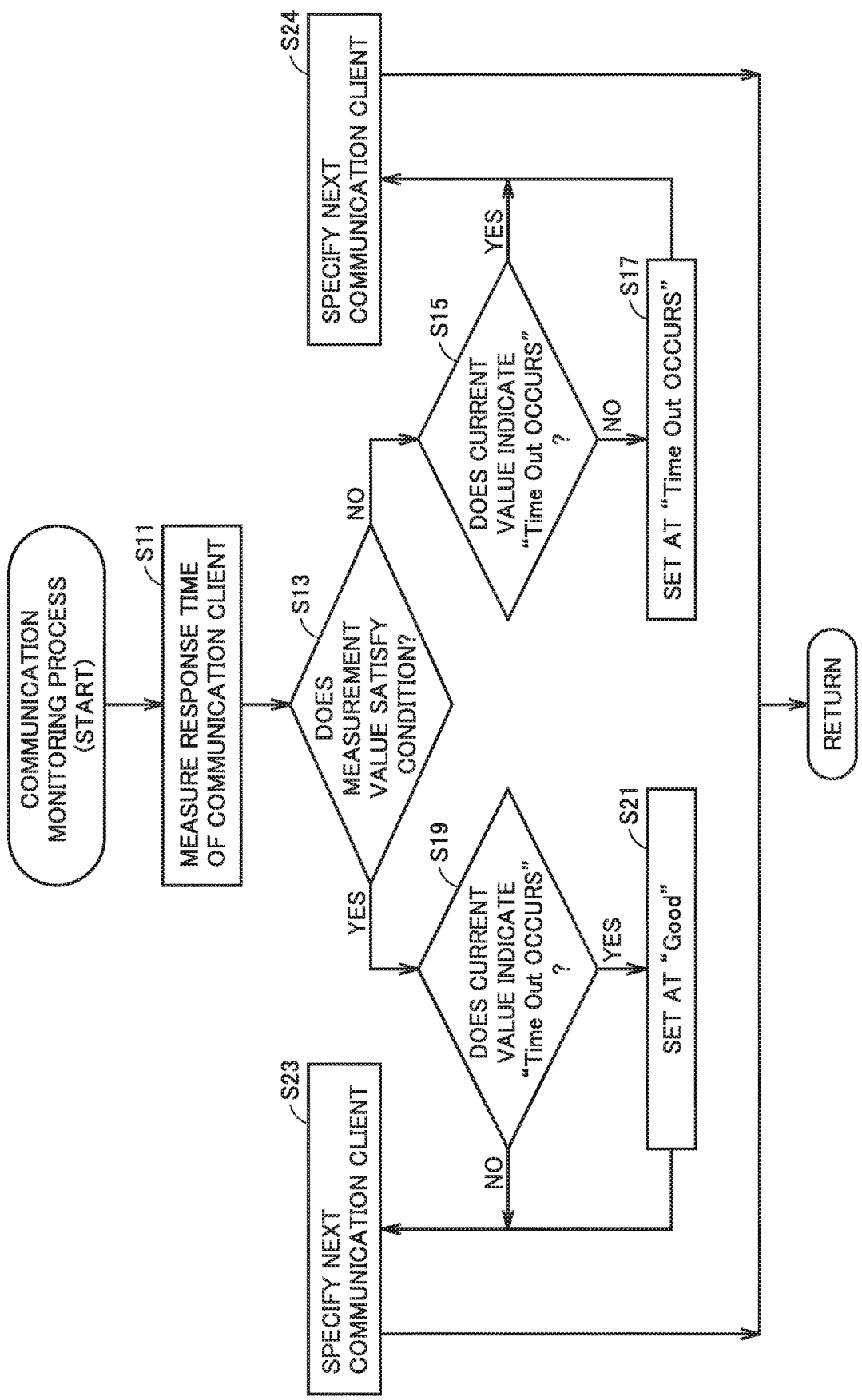
FIG. 10 schematically shows one example of a flowchart of a communication monitoring process according to the present embodiment.

FIG. 9 schematically shows one example of a flowchart of the allocation process according to the present embodiment. FIG. 10 schematically shows one example of a flowchart of a communication monitoring process according to the present embodiment. First, the communication monitoring process will be described with reference to FIG. 10. When allocation unit 188 receives data 70 from user program 186, monitoring unit 189 transmits a request for communication to the plurality of communication clients in accordance with the above-described order from a higher priority to a lower priority. In FIG. 10, the time required from transmission of the request for transmission of data 70 to communication client (X) 181 having a higher priority to reception of a response (Ack) to the request, i.e., the response time is measured (step S11).

When monitoring unit 189 determines that the response time does not satisfy condition 93 corresponding to communication client (X) 181, i.e., when monitoring unit 189 determines that the response time exceeds threshold value 96 of condition 93 (NO in step S13), and when monitoring unit 189 determines that the current value of state 94 corresponding to communication client (X) 181 in state information 95 indicates "Time Out occurs" (YES in step S15), monitoring unit 189 generates an allocation command that specifies communication client (Y) 182, and outputs the allocation command to allocation unit 188 (step S19). In contrast, when monitoring unit 189 determines that the current value of state 94 corresponding to communication client (X) 181 does not indicate "Time Out occurs" (NO in step S15), monitoring unit 189 sets state 94 corresponding to communication client (X) 181 at "Time Out occurs" (step S17) and the process proceeds to step S19. As a result, in PLC 100, when the response time of communication client (X) 181 having a higher priority does not satisfy condition 93 in transmission of data 70, communication client (Y) 182 having a next priority (i.e., a lower priority) is allocated as the communication client for transmitting data 70.

When monitoring unit 189 determines that the response time satisfies condition 93 corresponding to communication client (X) 181, i.e., when monitoring unit 189 determines that the response time does not exceed threshold value 96 of condition 93 (YES in step S13), and when monitoring unit 189 determines that the current value of state 94 corresponding to communication client (X) 181 indicates "Time Out occurs" (YES in step S19), monitoring unit 189 sets state 94 corresponding to communication client (X) 181 at "Good" (step S21), generates an allocation command that specifies communication client (X) 181, and outputs the allocation command to allocation unit 188 (step S23). In contrast, when monitoring unit 189 determines that the current value of state 94 corresponding to communication client (X) 181 does not indicate "Time Out occurs" (NO in step S19), the process proceeds to step S23. As a result, in PLC 100, when the response time of communication client (X) 181 having a higher priority satisfies condition 93 in transmission of data 70, communication client (X) 181 having a higher priority is allocated as the communication client for transmitting data 70.

The process by allocation unit 188 will be described with reference to FIG. 9. When user program 186 is executed (step R1), user program 186 outputs data 70 to allocation unit 188 (step R3). Thereafter, when user program 186 determines to end execution of the program (YES in step R5), user program 186 ends execution. When user program 186 determines not to end execution (NO in step R5), the process returns to step R1.

Allocation unit 188 determines whether or not to receive data 70 from user program 186 through port 68 (step S1). When allocation unit 188 determines not to receive data 70 (NO in step S1), step S1 is repeated. When allocation unit 188 determines to receive data 70 (YES in step S1), monitoring unit 189 performs the above-described communication monitoring process in FIG. 10 and outputs the allocation command to allocation unit 188 (step S3). Allocation unit 188 performs the above-described allocation process using the allocation command from monitoring unit 189 (step S5).

During execution of the program (step R7), communication client (X) 181 or communication client (Y) 182 receives data 70 from allocation unit 188, appends IP address 82 to received data 70, and outputs data 70 to upper communication controller 160. Thereafter, when the communication controller determines to end execution of the program (YES in step R8), the communication controller ends execution. When the communication controller determines not to end execution (NO in step R8), the process returns to step R7.

(Modification of Response Time)

In the above-described allocation process, monitoring unit 189 transmits the request to the communication client before data 70 is transmitted, and the time required from transmission of the request to reception of the response (Ack) is measured, to thereby detect the response time. However, a method for measuring the response time is not limited to this method. For example, allocation unit 188 may obtain the response time by measuring the time required from transmission of data 70 to communication client (X) 181 having a higher priority to reception of a response (such as, for example, a response indicating that transmission of data 70 to server 400 has been completed) from communication client (X) 181. In this case, allocation unit 188 determines whether or not the response time satisfies condition 93 corresponding to communication client (X) 181, and when allocation unit 188 determines that the response time does not satisfy condition 93, allocation unit 188 transmits data 70 to the communication client having a next priority, i.e., communication client (Y) 182. In this modification as well, similarly to the foregoing, allocation unit 188 sets (changes) state 94 of the communication client.

As described above, allocation unit 188 preferentially allocates communication client (X) 181 as the communication client for transmitting data 70. However, when the response time of communication client (X) 181 no longer satisfies condition 93, the allocation destination is switched to communication client (Y) 182. Thereafter, when the response time of communication client (X) 181 satisfies condition 93 again, the allocation destination returns to communication client (X) 181. Thus, when PLC 100 communicates data 70 to server 400, PLC 100 can continue the communication, while distributing a communication load among the multiplexed communication clients in PLC 100.

<H. Change of Allocation Rule>

Figure 11:
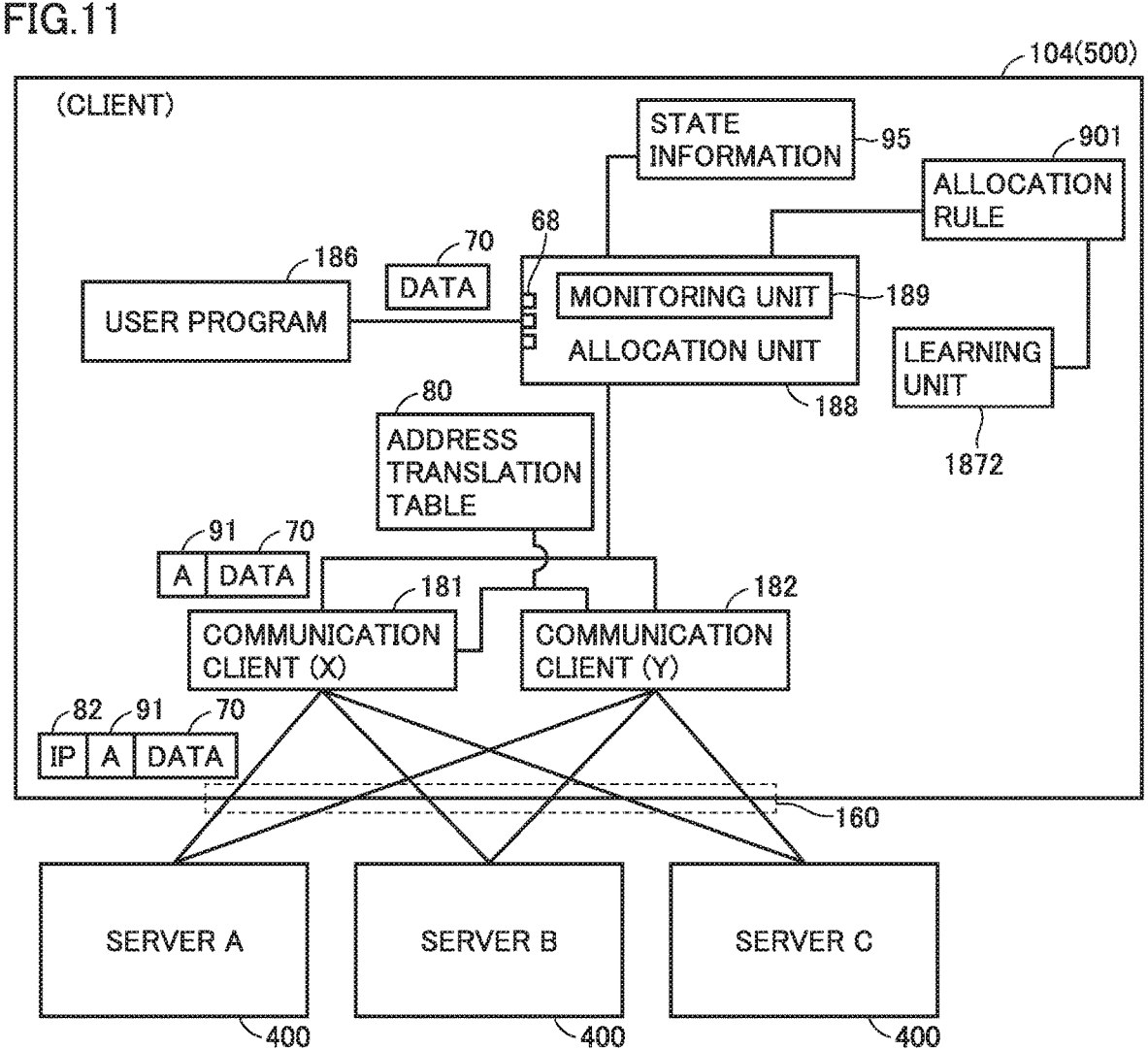
FIG. 11 is a schematic diagram showing another example of the configuration of the PLC together with the flow of data according to the present embodiment.
Figure 13:
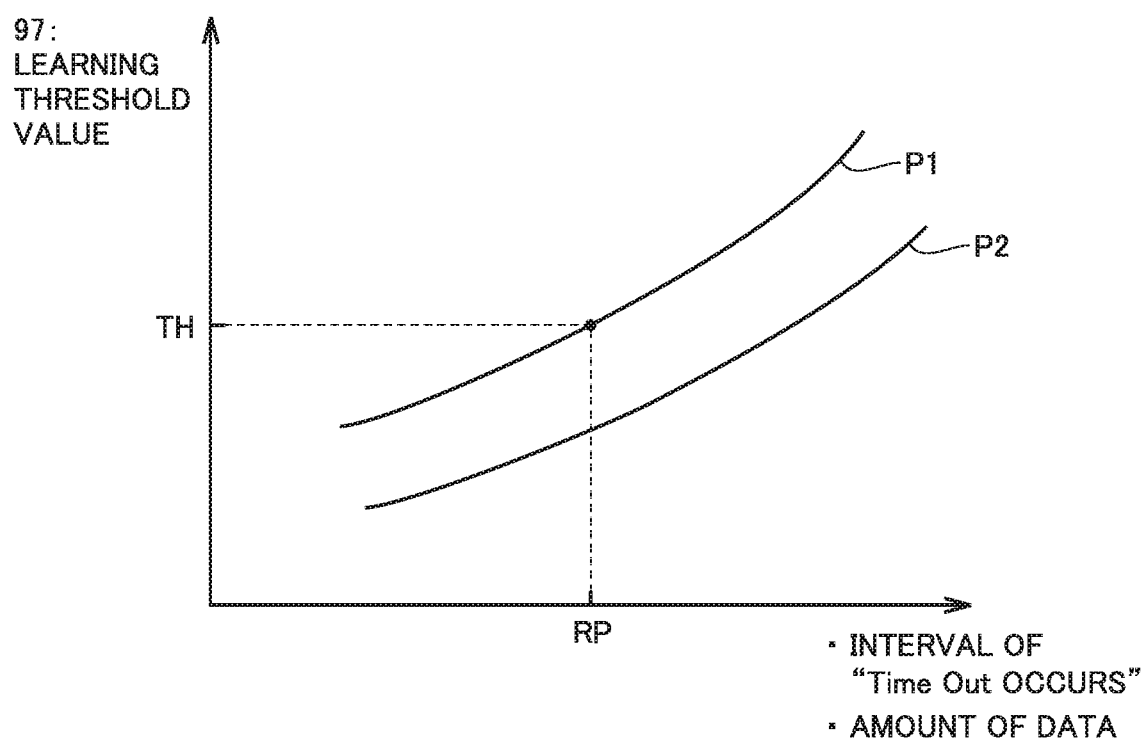
FIG. 13 schematically shows one example of change patterns of a threshold value by machine learning according to the present embodiment.

In the present embodiment, condition 93 of allocation rule 90 can be variably set. FIG. 11 is a schematic diagram showing another example of the configuration of the PLC together with the flow of data according to the present embodiment. FIG. 12 is a schematic diagram showing another example of the allocation rule according to the present embodiment. FIG. 13 schematically shows one example of change patterns of a threshold value by machine learning according to the present embodiment. Referring to FIG. 11, a PLC 500 includes a learning unit 1872 and an allocation rule 901 in FIG. 12, in addition to the configuration of PLC 100 shown in FIG. 6. The remaining portions of PLC 500 are similar to those of PLC 100 shown in FIG. 6, and thus, description will not be repeated.

Referring to FIG. 12, each record of allocation rule 901 includes destination 91, client identifier 92 and a condition 931. Condition 931 indicates, for example, (response time<learning threshold value 97). Learning unit 1872 sets (or changes) learning threshold value 97 of allocation rule 901. By machine learning using various types of communication feature amounts in communication with the communication client, learning unit 1872 detects a change pattern of a threshold value for ensuring the response performance to have a predetermined value. Learning unit 1872 sets learning threshold value 97 of allocation rule 901 in accordance with the detected change pattern.

Referring to FIG. 13, change patterns P1 and P2 detected by learning unit 1872 are shown in graph. In this graph, the horizontal axis indicates an interval of "Time Out occurs" (i.e., a time period from detection of "Time Out occurs" to next "Time Out occurs") or an amount of data transmitted to server 400, and the vertical axis indicates learning threshold value 97. In addition, patterns P1 and P2 in FIG. 13 are one example of change patterns of an optimum threshold value for ensuring the response performance. Pattern P1 corresponds to, for example, the interval of "Time Out occurs", and pattern P2 corresponds to, for example, the amount of transmitted data. Learning unit 1872 stores the generated change patterns of the threshold value in FIG. 13 in non-volatile memory 128. Although a change in the response performance is shown in connection with the two types, i.e., the interval of "Time Out occurs" and the amount of transmitted data in FIG. 13, the present invention is not limited thereto and a duration of "Good" may, for example, be used.

When learning unit 1872 sets learning threshold value 97 based on, for example, pattern P1, learning unit 1872 measures a representative value (such as an average or a mode for a prescribed time period) RP of the interval of "Time Out occurs" of communication client (X) 181 when communication between PLC 500 and server 400 is in execution. Learning unit 1872 obtains (determines) a threshold value TH corresponding to representative value RP from pattern P1 and sets obtained threshold value TH as learning threshold value 97 of allocation rule 901.

As a result, when a software abnormality occurs in the communication client or when a communication load becomes excessive, for example, the interval of "Time Out occurs" changes (becomes longer). Even in this case, in conjunction with the change in the interval of "Time Out occurs", learning threshold value 97 can be changed to ensure the response performance.

Alternatively, learning unit 1872 may change learning threshold value 97 to deal with a situation in which a communication load of the communication client becomes excessive due to congestion or the like of network 112 between PLC 500 and server 400. In this case, learning unit 1872 may learn a time-series or time-zone pattern of occurrence of congestion of network 112, and change the threshold value based on the result of learning before the congestion occurs.

<I. Allocation Based on Type of Communication Client>

Figure 14:
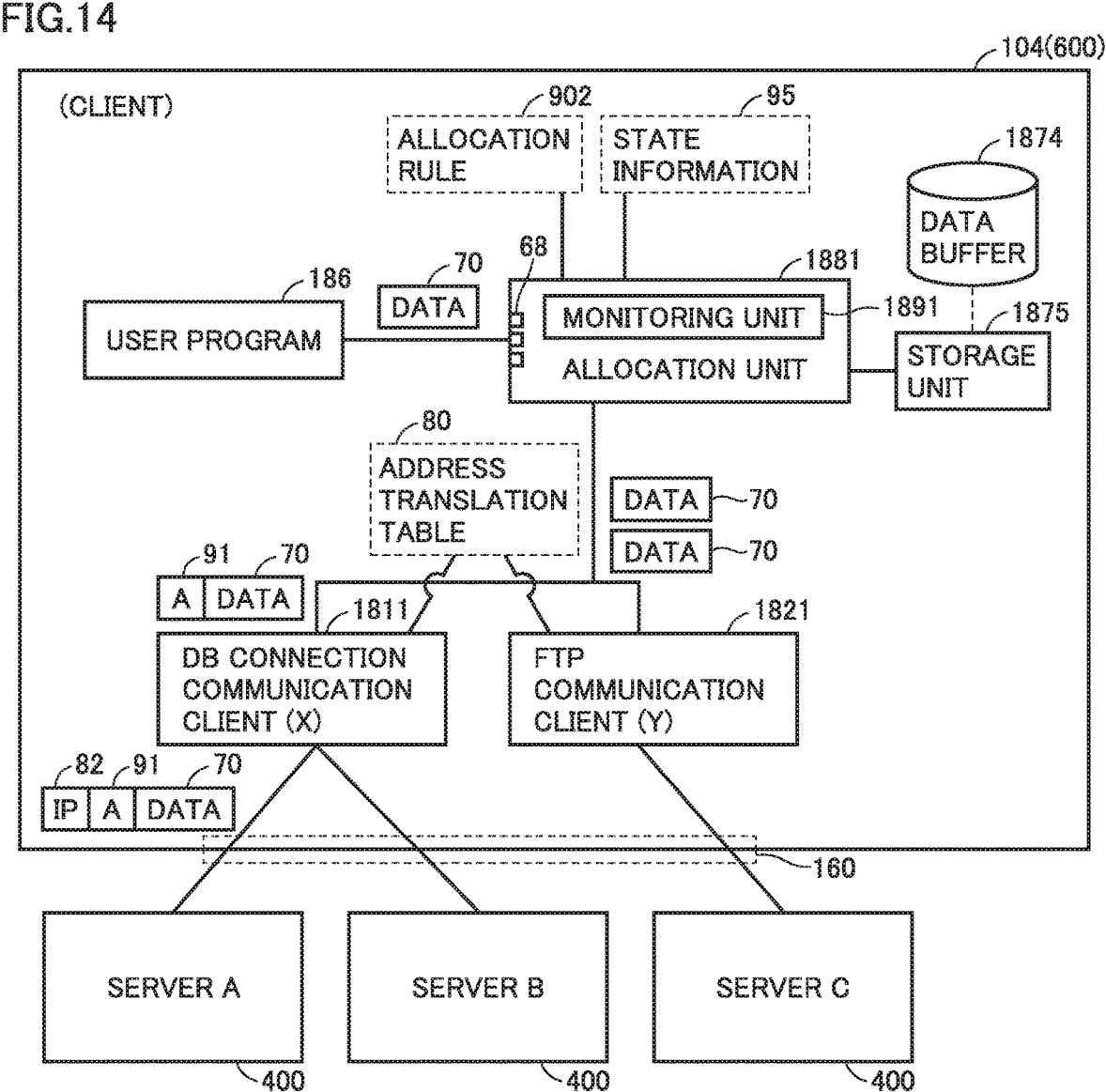
FIG. 14 is a schematic diagram showing still another example of the configuration of the PLC together with the flow of data according to the present embodiment.
Figure 16:
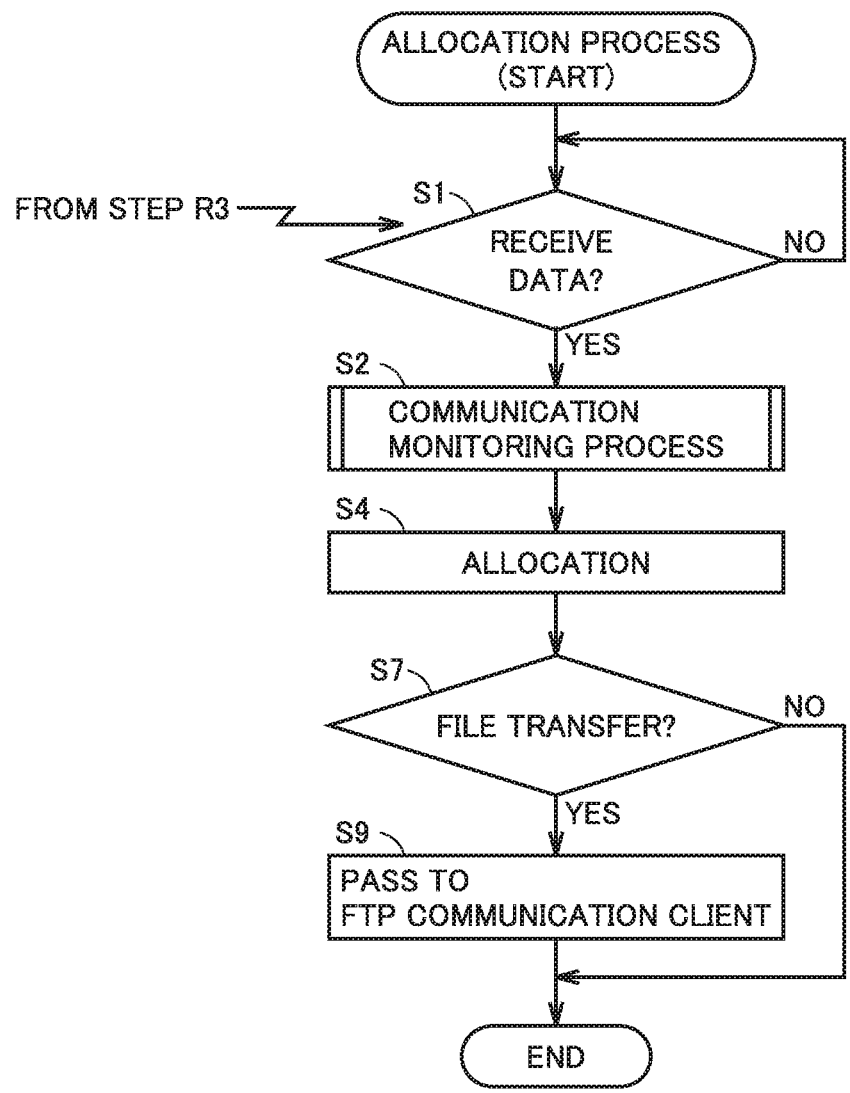
FIG. 16 is a flowchart showing another example of the allocation process according to the present embodiment.
Figure 17:
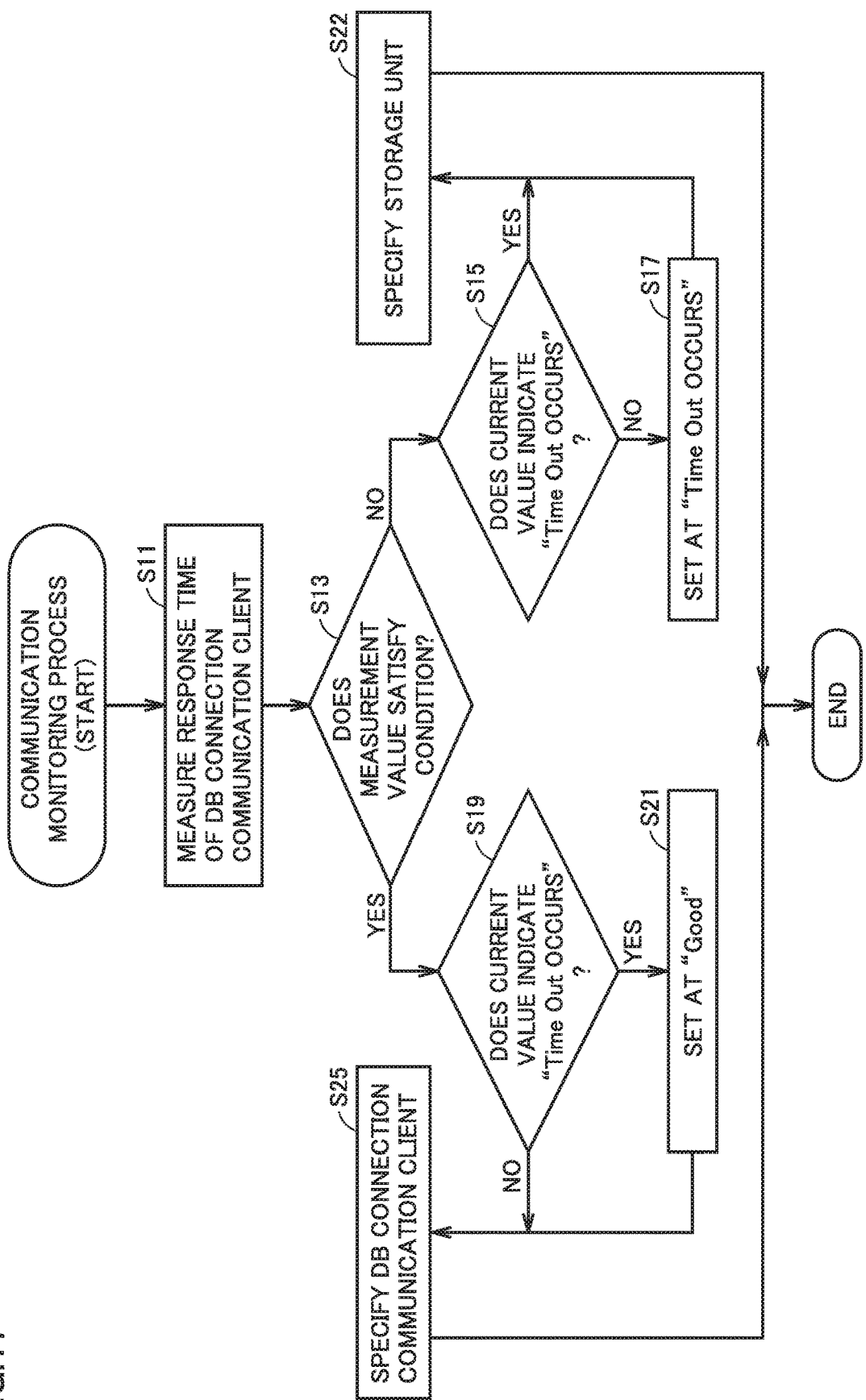
FIG. 17 is a flowchart showing another example of the communication monitoring process according to the present embodiment.

Communication client (X) 181 and communication client (Y) 182 described above provide the same type of communication function when executed. However, communication client (X) 181 and communication client (Y) 182 may provide different types of communication functions. FIG. 14 is a schematic diagram showing still another example of the configuration of the PLC together with the flow of data according to the present embodiment. FIG. 15 schematically shows still another example of the allocation rule according to the present embodiment. FIG. 16 is a flowchart showing another example of the allocation process according to the present embodiment. FIG. 17 is a flowchart showing another example of the communication monitoring process according to the present embodiment.

Referring to FIG. 14, a PLC 600 includes, as data transmission protocols used by the application layer, two types of data transmission protocols, i.e., a DB connection communication client (X) 1811 that performs a communication process in accordance with a DB connection protocol which is a communication protocol for connecting to the database server, and an FTP (File Transfer Protocol) communication client (Y) 1821. The type of the data transmission protocol applied to the communication client is not limited to these types. When PLC 600 is connected to the database server, a communication unit that controls communication between the database server and PLC 600 (more particularly, DB connection communication client (X) 1811) in accordance with the DB connection protocol may be interposed between the database server and PLC 600. Such a communication unit may include, for example, a communication device (e.g., a relay), software or the like that relays communication between the database server and PLC 600. In addition, PLC 600 in FIG. 14 includes an allocation unit 1881 having a monitoring unit 1891, and a storage unit 1875 that stores data 70 received from user program 186 in a data buffer 1874. Allocation unit 1881 searches allocation rule 902 and state information 95. The remaining portions of PLC 600 are similar to that shown in FIG. 6 or FIG. 11, and thus, description will not be repeated.

Referring to FIG. 15, each record of allocation rule 902 includes an action identifier 98, in addition to the contents of the record of allocation rule 901 in FIG. 12. Action identifier 98 indicates an action (process) to be performed by allocation unit 1881 when allocation unit 1881 receives data 70 from user program 186. In the present embodiment, action identifier 98 indicates either "transmit to communication client" or "transmit to buffer".

In PLC 600, monitoring unit 1891 monitors the response performance (e.g., response time) of DB connection communication client (X) 1811. During a time period in which monitoring unit 1891 determines that the response performance is good, monitoring unit 1891 sends the data to any one of servers 400 in real time by using DB connection communication client (X) 1811. Data 70 received during a time period in which the response performance is deteriorated is stored in data buffer 1874 by storage unit 1875. Thus, data 70 received from user program 186 during a time period in which the response performance of DB connection communication client (X) 1811 having a higher priority is deteriorated is stored (saved) in data buffer 1874. Allocation unit 1881 collectively sends data 70 stored in data buffer 1874 to FTP communication client (Y) 1821. FTP communication client (Y) 1821 performs file transfer of the data stored in data buffer 1874 to server 400.

As a result, even when server 400 in server A or server B goes down, above-described saved data 70 can be collectively transferred to server 400 in server C. Server C can send data 70 received from PLC 600 by file transfer to server A or server B. By using data 70 from server C as traceability information, DBMS 431 of server A or server B recovers DB 430 to a state that reflects the updated contents during the down time period. Thus, the accuracy of DB 430 of server A or server B can be ensured. A specific process will be described with reference to FIGS. 16 and 17.

First, the communication monitoring process by monitoring unit 1891 will be described with reference to FIG. 17. When allocation unit 1881 receives data 70 from user program 186, monitoring unit 1891 transmits a request for communication to the communication clients in accordance with the above-described order from a higher priority to a lower priority. In FIG. 14, the time required from transmission of the request to DB connection communication client (X) 1811 having a higher priority to reception of a response (Ack) to the request, i.e., the response time is measured (step S11).

When monitoring unit 1891 determines that the response time does not satisfy condition 931 corresponding to DB connection communication client (X) 1811, i.e., when monitoring unit 1891 determines that the response time exceeds learning threshold value 97 of condition 931 (NO in step S13), and when monitoring unit 1891 determines that the current value of state 94 corresponding to DB connection communication client (X) 1811 in state information 95 indicates "Time Out occurs" (YES in step S15), monitoring unit 1891 generates an allocation command that specifies storage unit 1875 as an allocation destination, and outputs the allocation command to allocation unit 1881 (step S22). Monitoring unit 1891 generates the allocation command to include corresponding action identifier 98 ("transmit to buffer") read from allocation rule 902.

In contrast, when monitoring unit 1891 determines that the current value of state 94 corresponding to DB connection communication client (X) 1811 does not indicate "Time Out occurs" (NO in step S15), monitoring unit 1891 sets state 94 corresponding to DB connection communication client (X) 1811 at "Time Out occurs" (step S17) and the process proceeds to step S22. As a result, in PLC 600, when the response time of DB connection communication client (X) 1811 having a higher priority does not satisfy condition 93 in transmission of data 70, storage unit 1875 is allocated to transmit data 70 to data buffer 1874.

When monitoring unit 1891 determines that the response time satisfies condition 931 corresponding to DB connection communication client (X) 1811, i.e., when monitoring unit 1891 determines that the response time does not exceed learning threshold value 97 of condition 931 (YES in step S13), and when monitoring unit 1891 determines that the current value of state 94 corresponding to DB connection communication client (X) 1811 indicates "Time Out occurs" (YES in step S19), monitoring unit 1891 sets state 94 corresponding to DB connection communication client (X) 1811 at "Good" (step S21), generates an allocation command that specifies the communication client having a higher priority, i.e., DB connection communication client (X) 1811, and outputs the allocation command to allocation unit 1881 (step S25). Monitoring unit 1891 generates the allocation command to include corresponding action identifier 98 ("transmit to communication client") in allocation rule 902.

In contrast, when monitoring unit 189 determines that the current value of state 94 corresponding to DB connection communication client (X) 1811 does not indicate "Time Out occurs" (NO in step S19), the process proceeds to step S25. As a result, in PLC 600, when the response time of DB connection communication client (X) 1811 having a higher priority satisfies condition 931 in transmission of data 70, DB connection communication client (X) 1811 having a higher priority is allocated as the communication client for transmitting data 70.

Next, the process by allocation unit 1881 will be described with reference to FIG. 16. Allocation unit 1881 determines whether or not to receive data 70 from user program 186 through port 68 (step S1). When allocation unit 1881 determines not to receive data 70 (NO in step S1), step S1 is repeated. When allocation unit 1881 determines to receive data 70 (YES in step S1), monitoring unit 1891 performs the communication monitoring process in FIG. 17 and outputs the allocation command including action identifier 98 to allocation unit 1881 (step S2).

Allocation unit 1881 performs the allocation process using the allocation command from monitoring unit 1891 (step S4). Specifically, when the allocation command indicates DB connection communication client (X) 1811, allocation unit 1881 appends destination 91 to data 70 in accordance with the action command ("transmit to communication client"), and passes data 70 to DB connection communication client (X) 1811 based on the allocation command. In contrast, when the allocation command indicates storage unit 1875, allocation unit 188 passes data 70 to storage unit 1875 which is an allocation destination indicated by the allocation command, in accordance with the action command ("transmit to buffer").

When DB connection communication client (X) 1811 receives data 70 from allocation unit 1881, DB connection communication client 1811 appends IP address 82 to received data 70, and outputs data 70 to upper communication controller 160.

When storage unit 1875 receives data 70 from allocation unit 1881, storage unit 1875 stores data 70 in data buffer 1874 in accordance with, for example, the order of reception.

Allocation unit 1881 determines whether or not to perform file transfer (step S7). For example, when the size of unsent data 70, of data 70 stored in data buffer 1874, exceeds a predetermined threshold value, allocation unit 1881 determines to perform file transfer (YES in step S7). When allocation unit 1881 determines not to perform file transfer (NO in step S7), the process ends.

When allocation unit 1881 determines to perform file transfer (YES in step S7), allocation unit 1881 reads unsent data 70 from data buffer 1874 and passes data 70 to FTP communication client 1821 (step S9). FTP communication client 1821 transmits data 70 received from allocation unit 1881 to server C in a file format having the IP address of server C appended thereto, in accordance with the FTP.

As described above, DB connection communication client (X) 1811 is preferentially allocated as the communication client for transmitting data 70. Thereafter, when the response time of DB connection communication client (X) 1811 satisfies condition 93, the allocation destination returns to DB connection communication client (X) 1811. During this time period, i.e., during the time period in which the response time of DB connection communication client (X) 1811 does not satisfy condition 93, data 70 received from user program 186 is not transmitted to the server. However, data 70 received from user program 186 can be stored and saved in data buffer 1874. Thus, loss of data 70 output from user program 186 can be prevented during this time period.

The data in data buffer 1874 is collectively file-transferred to server C and the data can be used to recover DB 430 of server A or server B.

The method for measuring the response time described in (Modification of Response Time) above is also applicable to the allocation process shown in FIGS. 16 and 17.

<J. Program>

The program indicating the process of each flowchart described in the present embodiment or at least one program shown in FIG. 4 is stored in the memory unit (such as non-volatile memory 128 and memory card 172) of PLC 100. A processor 20 reads the program from the memory unit and executes the program, and the control of communication described in the present embodiment can thereby be achieved.

The above-described program can also be recorded on a computer readable recording medium accompanying PLC 100, such as a flexible disk, a CD-ROM (Compact Disk-Read Only Memory), a ROM, a RAM, and memory card 172, and provided as a program product. Alternatively, the program can be recorded on a recording medium contained in PLC 100, such as a hard disk, and provided. Alternatively, the program can be provided by being downloaded from a not-shown network through the communication interface (such as upper communication controller 160 and communication port 168).

<K. Advantage of the Embodiment>

Figure 18:
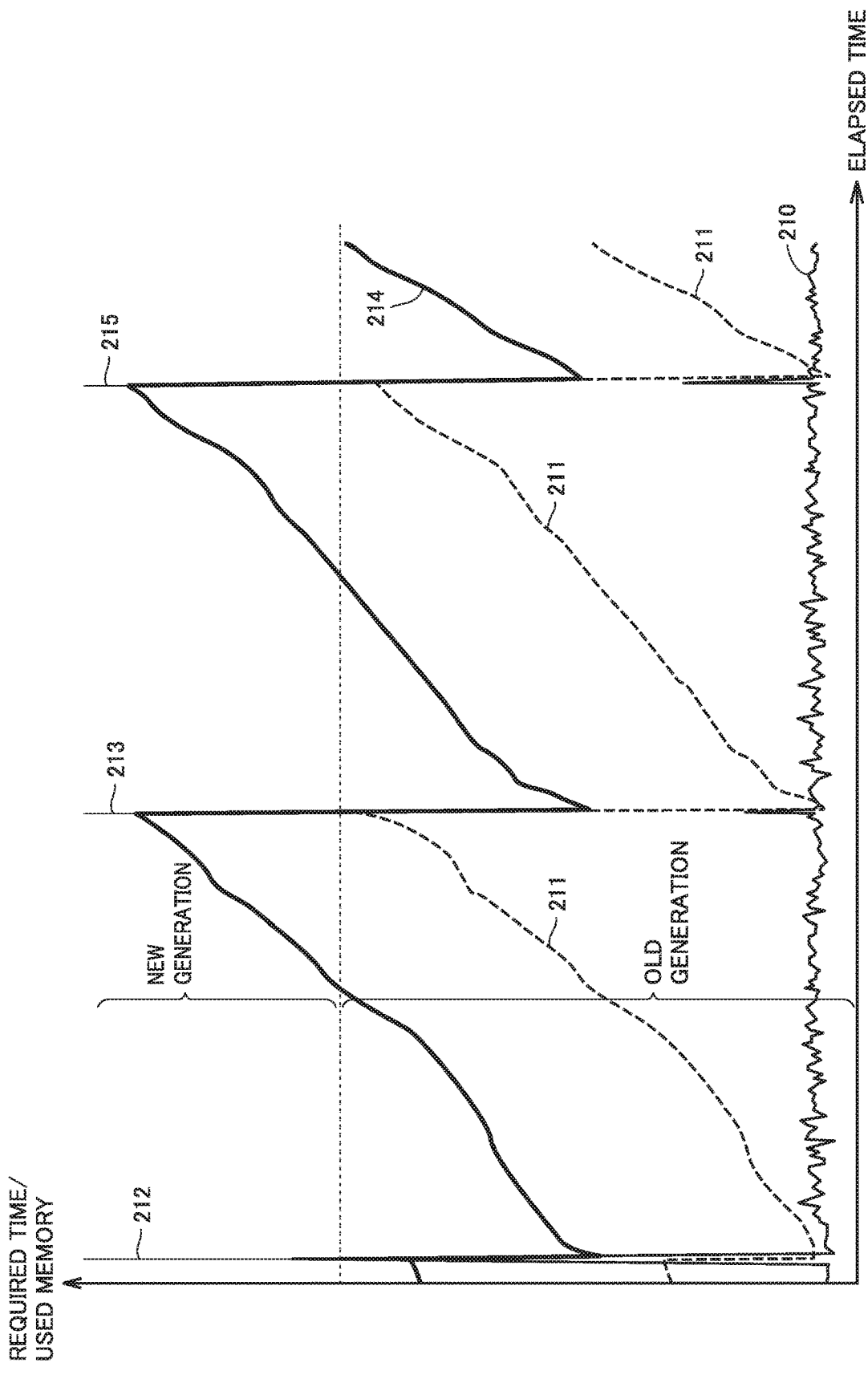
FIG. 18 schematically shows one example of a change in a used memory size in a communication stack according to the present embodiment.

FIG. 18 schematically shows one example of a change in a used memory size in the communication stack according to the present embodiment. An advantage in consideration of garbage collection will be described with reference to FIG. 18.

In the present embodiment, when a size of an object stored in the communication stack by the JVM exceeds a limitation size of the communication stack during execution of the communication client, the execution speed of the communication client decreases. A change in a memory size caused by such storage of the object is shown in FIG. 18 by way of example. The change in the memory size in FIG. 18 can be similarly applied to both communication stacks 191 and 192.

The predetermined limitation size of the communication stack corresponds to a size of a heap region. The heap region is formed of a New generation for storing a short-lived object that becomes unnecessary immediately after the object is generated, and an Old generation for storing a long-lived object that is required for a relatively long time. FIG. 18 shows a change over time in a used size 214 of the heap region and a used size 211 of the Old generation.

The JVM performs full garbage collection directed to substantially the whole of the heap region including the Old generation, and garbage collection directed only to the New generation. FIG. 18 shows a time 212, a time 213 and a time 215 at which full garbage collection is performed, and a time 210 required for garbage collection. During a time period between full garbage collection and full garbage collection, garbage collection directed only to the New generation may be performed.

As shown in FIG. 18, when full garbage collection is performed, time 210 required for garbage collection becomes longer, and thus, the execution speed of the communication client by the JVM decreases. In the present embodiment, the timing of performance of full garbage collection can be detected (estimated) based on the fact that the response time of the communication client no longer satisfies condition 93 (931). As a result, even during the time in which full garbage collection is performed, communication of data 70 between the PLC and the server can be continued, and data loss can be prevented by storing data 70 in data buffer 1874.

<L. Another Advantage of the Embodiment>

Figure 19:
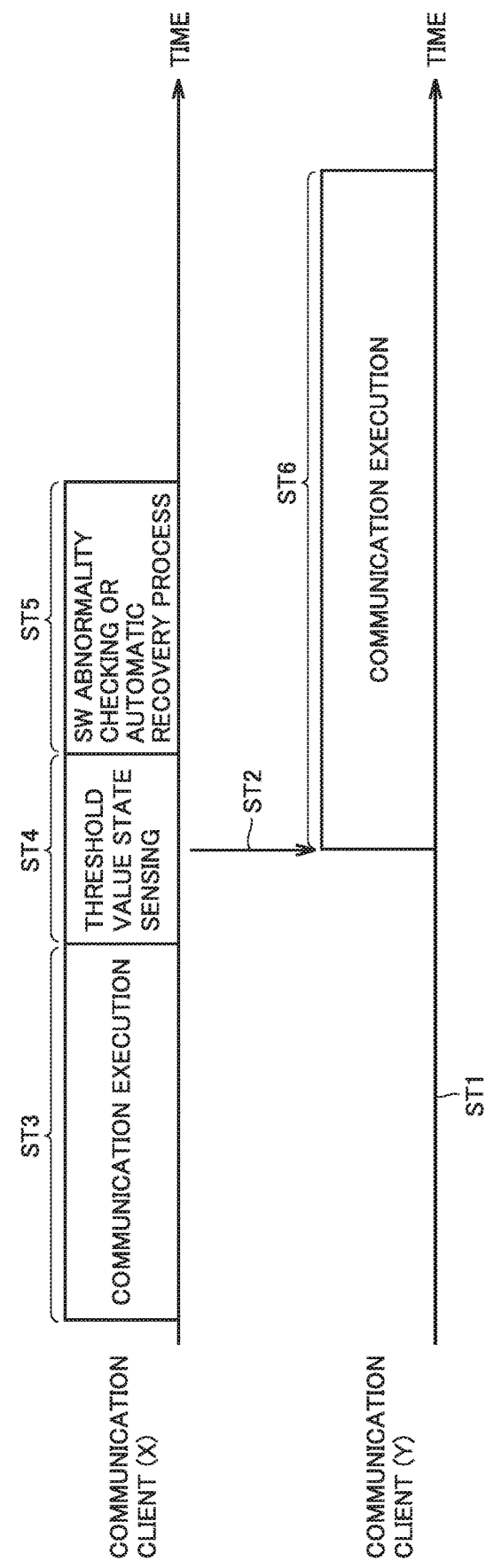
FIG. 19 schematically shows one example of a manner of switching between communication clients according to the present embodiment.

FIG. 19 schematically shows one example of a manner of switching between the communication clients according to the present embodiment. With reference to FIG. 19, description will be given of the case in which communication can be continued by performing switching to communication client (Y) 182 when an abnormality occurs while communication client (X) 181 is executing communication, for example.

First, let us assume that, of communication client (X) 181 and communication client (Y) 182, communication client (X) 181 is in a state ST3 of executing communication and communication client (Y) 182 is in a state ST1 of being at a standstill. When a program abnormality or the like, for example, occurs in communication client (X) 181 and the response time no longer satisfies condition 93 (state ST4) while communication client (X) 181 is executing communication, communication client (X) 181 stops communication and shifts to a state of execution of an abnormality checking or automatic recovery process (state ST5). In addition, at this time, the allocation destination of data 70 is switched to communication client (Y) 182 and a switching notification is provided to communication client (Y) 182 (state ST2). When JVM 184 receives the switching notification, JVM 184 switches communication client (Y) 182 from the stop state to a communication execution state (state ST6). As a result, communication is executed by communication client (Y) 182 and data 70 is transmitted to server 400.

As described above, when an abnormality occurs in communication client (X) 181, communication client (Y) 182 that is in the stop state can be switched from the stop state to the communication execution state, which allows data 70 to arrive at server 400 by communication client (Y) 182. In addition, since communication client (Y) 182 is in the stop state until communication client (Y) 182 receives the switching notification, a load of program execution in PLC 100 can be reduced during the time period in which communication client (Y) 182 is in the stop state.

<M. Another Advantage of the Embodiment>

Figure 20:
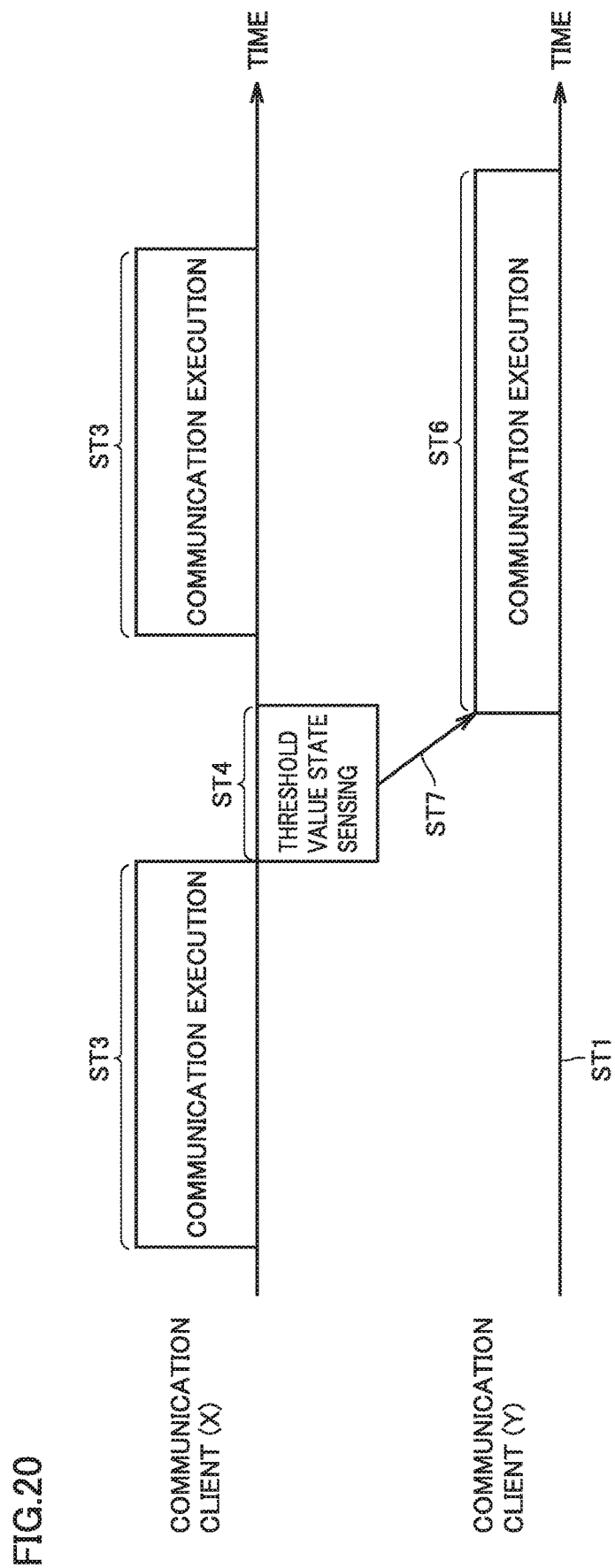
FIG. 20 schematically shows another example of the manner of switching between the communication clients according to the present embodiment.

FIG. 20 schematically shows another example of the manner of switching between the communication clients according to the present embodiment. The case of simultaneously performing communication by communication client (X) 181 and communication by communication client (Y) 182 will be described with reference to FIG. 20.

Referring to FIG. 20, when the response time no longer satisfies condition 93 (state ST4) in the communication execution state of data 70 by communication client (X) 181 (state ST3), allocation unit 188 then passes received data 70 to communication client (Y) 182 (state ST7). Communication client (Y) 182 shifts from the communication stop state (state ST1) to the communication execution state (state ST6). As a result, a load of communication client (X) 181 can be reduced. If allocation unit 188 further receives next data 70 before communication of data 70 by communication client (Y) 182 is completed, allocation unit 188 can, at this point in time, pass data 70 to the communication client (X) whose response time satisfies condition 93. As a result, in PLC 100, the communication execution state (state ST3) of communication client (X) 181 and the communication execution state (state ST6) of communication client (Y) 182 can be continued in parallel, and thus, multiplexing communication (e.g., time-divisional multiplexing communication) of data 70 by both communication client (X) 181 and communication client (Y) 182 through upper communication controller 160 can be achieved.

<N. Further Advantage of the Embodiment>

An advantage in consideration of a usage environment of the PLC will be described. In recent years, a PLC is connected to an external device such as a database system to accumulate data held in the PLC in the database system. This can facilitate sharing of the data among information processing devices connected to a database, or can facilitate collection of various types of data and compilation, analysis or the like of the data.

As to the communication function contained in the PLC connected to the external device as described above, the communication function contained in the PLC using, for example, a Common Industrial Protocol (CIP) provides communication stacks to correspond to two communication ports.

By using the two communication ports as described above, multiplexing of the communication units that share physical communication port 168 is achieved in the PLC according to the present embodiment, as compared with the case in which the communication units are multiplexed in the PLC, and thus, the number of components can be reduced. Even if the communication units in the PLC are multiplexed, no special change corresponding to the multiplexing is required on the server 400 side. Therefore, the present embodiment can be implemented using an existing control system.

<O. Additional Notes>

The present embodiment described above includes the following technical idea.

[Configuration 1]

A controller (100) comprising:

a communication program execution unit (104) that executes a plurality of communication programs (181, 182);

a user program execution unit (104) that executes a user program (186) for controlling an object to be controlled, the user program including an instruction for communicating with an external device (400);

a communication interface (160) that is connectable to any of the plurality of communication programs and controls communication between the plurality of communication programs and the external device; and a determination unit (188) that receives data (70) to be communicated to the external device from the user program execution unit when the instruction is executed by the user program execution unit, and based on a destination of the data, determines a communication program for transmitting the data to the external device, from among the plurality of communication programs.

[Configuration 2]

The controller according to Configuration 1, comprising a communication stack (191, 192) for each of the communication programs.

[Configuration 3]

The controller according to Configuration 1 or 2, wherein based on an execution state of each of the communication programs and the destination (91), the determination unit determines a communication program for transmitting the data to the external device, from among the plurality of communication programs.

[Configuration 4]

The controller according to Configuration 3, wherein when the execution state of the communication program based on the destination satisfies a predetermined condition (93), the determination unit determines the communication program as a communication program for transmitting the data to the external device.

[Configuration 5]

The controller according to Configuration 4, wherein the execution state of the communication program is indicated by response performance of communication of the communication program in execution.

[Configuration 6]

The controller according to Configuration 5, wherein the predetermined condition includes a threshold value (96) of the response performance, and the threshold value is determined by machine learning using a communication feature amount related to the response performance.

[Configuration 7]

The controller according to any one of Configurations 4 to 6, wherein when the execution state of the communication program based on the destination does not satisfy the predetermined condition, the determination unit determines another communication program as a communication program for transmitting the data to the external device.

[Configuration 8]

The controller according to any one of Configurations 4 to 6, wherein when the execution state of the communication program based on the destination does not satisfy the predetermined condition, the determination unit outputs the data to a storage unit (1875).

[Configuration 9]

The controller according to Configuration 8, wherein the controller transmits the data in the storage unit to the external device through a prescribed communication program (1821) of the communication programs.

[Configuration 10]

The controller according to Configuration 9, wherein a type of the communication program based on the destination is different from a type of the prescribed communication program, and the type of the communication program corresponds to a type of a communication protocol in accordance with which the communication program transmits the data.

[Configuration 11]

The controller according to Configuration 10, wherein the external device includes a database server, and the type of the communication protocol includes a communication protocol for connecting to the database server or a communication unit that controls communication between the database server and the controller.

[Configuration 12]

A control method by a controller (100), the control method comprising:

executing a plurality of communication programs (181, 182) (R7);

executing a user program (186) for controlling an object to be controlled, the user program including an instruction for communicating with an external device (400) (R1);

the controller including a communication interface (160) that is connectable to any of the plurality of communication programs and controls communication between the plurality of communication programs and the external device; and receiving data (70) to be communicated to the external device from the user program when the instruction of the user program is executed, and based on a destination of the data, determining a communication program for transmitting the data to the external device, from among the plurality of communication programs (S3, S5).

[Configuration 13]

A program for causing a computer to execute the control method as recited in Configuration 12.

It should be understood that the embodiment disclosed herein is illustrative and non-restrictive in every respect. The scope of the present invention is defined by the terms of the claims, rather than description above, and is intended to include any modifications within the scope and meaning equivalent to the terms of the claims.

REFERENCE SIGNS LIST

1 control system; 68 port; 70 data; 80 address translation table; 90, 901, 902 allocation rule; 95 state information; 96, TH threshold value; 97 learning threshold value; 100 controller; 112 network; 120 processor; 128 non-volatile memory; 160 upper communication controller; 168 communication port; 181 communication client (X); 182 communication client (Y); 185 hypervisor; 186 user program; 187 system program; 188, 1881 allocation unit; 189, 1891 monitoring unit; 190 hardware resource; 191, 192 communication stack; 1811 DB connection communication client; 1821 FTP communication client; 1872 learning unit; 1874 data buffer; 1875 storage unit; P1, P2 pattern; RP representative value.

The invention claimed is:

1. A controller comprising
a first connector that connects the controller to a first external communication network;
a second connector that connects the controller to a second external communication network that is different than the first external communication network; and
a processor configured to perform operations comprising:
operation as a communication program execution module that executes a plurality of communication programs;
operation as a user program execution module that executes a user program including (i) a command for communicating, over the first external communication network, with an object to be controlled and controlling the object, and (ii) an instruction for communicating, over the second external communication network, with an external device, the object and the external device being provided outside the controller;
operation as a communication interface that is connectable to any of the plurality of communication programs and that controls communication between the plurality of communication programs and the external device over the second external communication network; and
operation as a determination module that receives data to be transmitted to the external device from the user program execution module when the instruction is executed by the user program execution module, and based on a destination of the data, determines a communication program for transmitting the data to the external device, from among the plurality of communication programs, the data to be transmitted to the external device including information associated with the user program communicating with the object and a database operation instruction for accumulating the information in the database.

2. The controller according to claim 1, wherein the information comprises a communication stack for each of the communication programs.

3. The controller according to claim 1, wherein the processor is configured such that operation as the determination module comprises determining, based on an execution state of each of the communication programs and the destination, a communication program for transmitting the data to the external device, from among the plurality of communication programs.

4. The controller according to claim 3, wherein the processor is configured such that operation as the determination module comprises determining, when the execution state of the communication program based on the destination satisfies a predetermined condition, the communication program as a communication program for transmitting the data to the external device.

5. The controller according to claim 4, wherein the processor is configured such that the execution state of the communication program is indicated by response performance of communication of the communication program in execution.

6. The controller according to claim 5, wherein the processor is configured such that
the predetermined condition includes a threshold value of the response performance, and
the threshold value is determined by machine learning using a communication feature amount related to the response performance.

7. The controller according to claim 4, wherein the processor is configured such that operation as the determination module comprises determining, when the execution state of the communication program based on the destination does not satisfy the predetermined condition, another communication program as a communication program for transmitting the data to the external device.

8. The controller according to claim 4, wherein the processor is configured such that operation as the determination unit comprises outputting, when the execution state of the communication program based on the destination does not satisfy the predetermined condition, the data to a storage.

9. The controller according to claim 8, wherein the processor is configured to perform operations further comprising transmitting the data in the storage to the external device through a prescribed communication program of the communication programs.

10. The controller according to claim 9, wherein the processor is configured such that
a type of the communication program based on the destination is different from a type of the prescribed communication program, and
the type of the communication program corresponds to a type of a communication protocol in accordance with which the communication program transmits the data.

11. The controller according to claim 10, wherein
the external device includes a database server or a communication module that controls communication between the database server and the controller, and
the processor is configured such that the type of the communication protocol includes a communication protocol for connecting to the database server.

12. A control method by a controller connectable to a first communication network and a second communication network different from the first communication network, the control method comprising:
executing a plurality of communication programs;
executing a user program including (i) a command for communicating, over the first external communication network, with an object to be controlled and controlling the object, and (ii) an instruction for communicating over the second external communication network, with an external device, the object and the external device being provided outside the controller;

the controller including a communication interface that is connectable to any of the plurality of communication programs and that controls communication between the plurality of communication programs and the external device over the second external communication network; and receiving data to be transmitted to the external device from the user program when the instruction of the user program is executed, and based on a destination of the data, determining a communication program for transmitting the data to the external device, from among the plurality of communication programs, the data to be transmitted to the external device including information associated with the user program communicating with the object and a database operation instruction for accumulating the information in the database.

13. A non-transitory computer-readable storage medium storing a program for causing a computer included in a controller connectable to a first communication network and a second communication network different from the first communication network to execute a control method, the control method comprising:

executing a plurality of communication programs;

executing a user program including (i) a command for communicating, over the first external communication network, with an object to be controlled and controlling the object, and (ii) an instruction for communicating over the second external communication network, with an external device, the object and the external device being provided outside the controller;

the controller including a communication interface that is connectable to any of the plurality of communication programs and that controls communication between the plurality of communication programs and the external device over the second external communication network; and receiving data to be transmitted to the external device from the user program when the instruction of the user program is executed, and based on a destination of the data, determining a communication program for transmitting the data to the external device, from among the plurality of communication programs, the data to be transmitted to the external device including information associated with the user program communicating with the object and a database operation instruction for accumulating the information in the database.

* * * * *